United States Patent
Cellier et al.

(10) Patent No.: US 11,024,017 B2
(45) Date of Patent: Jun. 1, 2021

(54) TONE MAPPING ADAPTATION FOR SATURATION CONTROL

(71) Applicant: INTERDIGITAL VC HOLDINGS, INC., Wilmington, DE (US)

(72) Inventors: Francois Cellier, Rennes (FR); Patrick Lopez, Livré sur Changeon (FR); Yannick Olivier, Thorigné Fouillard (FR); David Touze, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/205,505

(22) Filed: Nov. 30, 2018

(65) Prior Publication Data

US 2019/0164262 A1 May 30, 2019

(30) Foreign Application Priority Data

Nov. 30, 2017 (EP) .................................... 17306670

(51) Int. Cl.
*G06K 9/00* (2006.01)
*G06T 5/00* (2006.01)
*G06T 5/20* (2006.01)

(52) U.S. Cl.
CPC ............. *G06T 5/009* (2013.01); *G06T 5/20* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 6,735,330 B1 * | 5/2004 | Van Metter | G06T 5/008 382/132 |
| 7,768,496 B2 * | 8/2010 | Daly | G09G 3/3406 345/102 |
| 8,472,748 B2 * | 6/2013 | Jang | G06T 5/20 382/266 |

(Continued)

FOREIGN PATENT DOCUMENTS

| EP | 3051489 A1 * | 8/2016 | ........... H04N 19/186 |
|---|---|---|---|
| EP | 3051792 A1 * | 8/2016 | ............... H04N 9/68 |

(Continued)

OTHER PUBLICATIONS

Zonal brightness coherency for video tone mapping, Ronan Boitard et al., Elsevier, 2013, pp. 229-246 (Year: 2013).*

(Continued)

*Primary Examiner* — Jayesh A Patel
(74) *Attorney, Agent, or Firm* — Invention Mine LLC

(57) ABSTRACT

A system and methods is provided for performing, by a processor, an initial tone mapping function on a first image to produce a second image. The first and second images are of different dynamic ranges. The method also includes applying, by the processor, a second tone mapping function to the second image when it contains any saturated portions. The second tone mapping function lowers luminance by a first fraction. The overall luminance of the second image is also determined and a fine tuning filter is applied when at least portions of said second image contain areas darker than an amount.

21 Claims, 21 Drawing Sheets performing an initial tone mapping function on a first image to produce a second image - first and second images are of different dynamic ranges — 1810 applying, by the processor, a second tone mapping function to said second image to any saturated portions of said second image; wherein said second tone mapping function lowers luminance by a first fraction — 1820 determining overall luminance of said second image and applying a fine tuning filter when at least portions of said second image contain areas darker than an amount. — 1830

(56) References Cited

U.S. PATENT DOCUMENTS

| | | | | |
|---|---|---|---|---|
| 8,750,608 | B2* | 6/2014 | Jang | G06T 5/009 |
| | | | | 382/166 |
| 8,982,936 | B2* | 3/2015 | Yang | H04B 17/0085 |
| | | | | 375/224 |
| 9,087,382 | B2* | 7/2015 | Zhai | G06T 5/008 |
| 10,148,906 | B2* | 12/2018 | Seifi | G06T 5/009 |
| 2004/0218830 | A1* | 11/2004 | Kang | H04N 5/2352 |
| | | | | 382/274 |
| 2007/0092139 | A1* | 4/2007 | Daly | G09G 3/3406 |
| | | | | 382/169 |
| 2009/0003718 | A1* | 1/2009 | Liu | H04N 19/102 |
| | | | | 382/238 |
| 2009/0067713 | A1* | 3/2009 | Chen | H04N 1/4074 |
| | | | | 382/169 |
| 2009/0295705 | A1* | 12/2009 | Chen | G09G 3/3611 |
| | | | | 345/102 |
| 2009/0317017 | A1* | 12/2009 | Au | G06T 5/40 |
| | | | | 382/274 |
| 2010/0283861 | A1* | 11/2010 | Tamagawa | H04N 1/603 |
| | | | | 348/222.1 |
| 2010/0328490 | A1* | 12/2010 | Kurane | H04N 5/35554 |
| | | | | 348/229.1 |
| 2011/0194618 | A1* | 8/2011 | Gish | H04N 19/59 |
| | | | | 375/240.25 |
| 2011/0292246 | A1* | 12/2011 | Brunner | G06T 5/40 |
| | | | | 348/231.99 |
| 2011/0305388 | A1* | 12/2011 | Wedi | G06T 5/005 |
| | | | | 382/165 |
| 2012/0038797 | A1* | 2/2012 | Jang | G06T 5/008 |
| | | | | 348/241 |
| 2012/0257824 | A1* | 10/2012 | Jang | G06T 5/009 |
| | | | | 382/166 |
| 2012/0262600 | A1* | 10/2012 | Velarde | H04N 9/735 |
| | | | | 348/223.1 |
| 2013/0076763 | A1* | 3/2013 | Messmer | G06K 9/00 |
| | | | | 345/506 |
| 2014/0078193 | A1* | 3/2014 | Barnhoefer | G09G 3/3607 |
| | | | | 345/690 |
| 2015/0170389 | A1* | 6/2015 | Ming | G06T 5/009 |
| | | | | 382/284 |
| 2015/0248747 | A1* | 9/2015 | Atkins | G06T 5/10 |
| | | | | 345/589 |
| 2016/0005153 | A1* | 1/2016 | Atkins | H04N 9/67 |
| | | | | 345/591 |
| 2016/0005349 | A1* | 1/2016 | Atkins | H04N 5/20 |
| | | | | 345/591 |
| 2016/0286226 | A1* | 9/2016 | Ridge | H04N 19/50 |
| 2017/0272690 | A1* | 9/2017 | Seifi | G06T 5/009 |
| 2017/0324959 | A1 | 11/2017 | Olivier et al. | |
| 2018/0007356 | A1* | 1/2018 | Kadu | G06T 5/009 |
| 2018/0025477 | A1* | 1/2018 | Min | H04N 1/6027 |
| | | | | 345/590 |
| 2018/0232867 | A1* | 8/2018 | Park | G06T 5/008 |
| 2019/0130546 | A1* | 5/2019 | Le Naour | H04N 19/86 |

FOREIGN PATENT DOCUMENTS

| | | |
|---|---|---|
| WO | WO2012125802 | 9/2012 |
| WO | 2016055178 A | 4/2016 |

OTHER PUBLICATIONS

Temporally Coherent Local Tone Mapping of HDR Video, Tunc, Ozan Aydin et al., ACM Transactions on Graphics, vol. 33, No. 6, Article 196, dated Nov. 2014, pp. 196:1 to 196:13 (Year: 2014).*

Anonymous, "Dynamic Metadata for Color Volume Transform—Application #2", Society for Motion Picture and Television Engineers, SMPTE Standard, SMPTE ST 2094-20:2016, Jul. 6, 2016, pp. 1-23.

Recommendation, ITU-R. BT "709-6, Parameter Values for the HDTV Standards for Production and International Programme Exchange". Jun. 2015.

Kim, Hwi-Gang, et al. "Color saturation compensation in iCAM06 for high-chroma HDR imaging." IEICE Transactions on Fundamentals of Electronics, Communications and Computer Sciences vol. 94-A, No. 11 (Nov. 2011) pp. 2353-2357.

Standard, S. M. P. T. E "High dynamic range electro-optical transfer function of mastering reference displays." SMPTE: ST 2084 (2014) pp. 1-14.

Kim, Hwi-Gang, and Sung-Hak Lee. "Separate Color Correction for Tone Compression in HDR Image Rendering." IEICE Transactions on Fundamentals of Electronics, Communications and Computer Sciences vol. E96-A, No. 8 (Aug. 2013) pp. 1752-1758.

Recommendation, ITU-R. BT "2020-2, Parameter values for ultra-high definition television systems for production and international programme exchange" Oct. 2015.

Braun, K. M., et al., "Development and evaluation of six gamut-mapping algorithms for pictorial images." In Color and Imaging Conference, pp. 144-148. Society for Imaging Science and Technology, 1999.

* cited by examiner

TONE MAPPING ADAPTATION FOR SATURATION CONTROL

REFERENCE TO RELATED APPLICATION

This application claims priority from European Patent Application No. 17306670.5, entitled "TONE MAPPING ADAPTATION FOR SATURATION CONTROL", filed on Nov. 30, 2017, the contents of which are hereby incorporated by reference in its entirety.

TECHNICAL FIELD

The present disclosure relates generally to picture and video distribution in high-dynamic range (HDR) and more generally to tone mapping adaptation for saturation control in HDR compatible devices.

BACKGROUND

This section is intended to introduce the reader to various aspects of art, which may be related to various aspects of the present invention that are described and/or claimed below. This discussion is believed to be helpful in providing the reader with background information to facilitate a better understanding. Accordingly, it should be understood that these statements are to be read in this light, and not as admissions of prior art.

A particular challenge in color reproduction has to do with the issue of color saturation. Color saturation generally refers to the intensity of color in an image and the expression of the bandwidth of light from a source. Color saturation determines how a certain hue will look in certain lighting conditions. For example, a navy colored surface may appear a brighter blue in sunlight and alternatively black at night. In photography, especially digital photography, having areas in an image that include extremely bright light can affect the overall color representation and color saturation. This is because most cameras and other mediums can provide a limited color range. An image sensor capturing the image becomes saturated to the maximum value when handling the bight areas and therefore, may not represent color accurately in other areas. In this way, when the color value of light exceeds the maximum value, up to which an image sensor visualizes the color, the corresponding color value is clipped to the maximum value. In such a case, the clipped pixel is said to be saturated. In addition, the surrounding pixels influenced by saturated pixels also lose their colors. These pixels are also said to be saturated. Therefore, the saturated pixels, which have wrong color values, need to be corrected in order to represent the original color value faithfully.

The problem of handling color saturation becomes more problematic when HDR images are to be processed by devices of lower range. Current prior art techniques are limited in solutions they present. Consequently, improved techniques are desirous that provide correct colors representations when saturation issues exist especially when HDR captured image need to be processed by devices with a more limited dynamic range.

SUMMARY

In one embodiment, a method is provided for applying, by a processor, an initial tone mapping function on a first image to produce a second image. The first and second images are of different dynamic ranges. The method also includes applying, by the processor, a second tone mapping function to the second image when it contains any saturated portions. The second tone mapping function lowers luminance by a first fraction. The overall luminance of the second image is also determined and a fine-tuning filter is applied when at least portions of said second image contain areas darker than an amount, where the fine tuning filter increases the overall luminance of the second image by a second fraction.

In an alternate embodiment, the second image is to be displayed on an output device having a display. In this way the processor further includes the steps of obtaining an input color gamut related to the first image and obtaining an output color gamut related to said second image as it will be displayed on said output device. The processor will then modify the output color gamut to match the input color gamut by calculating a minimized perceived color error between the input color gamut and the output color gamut.

In yet another embodiment a system is provided having a processor configured to perform an initial tone mapping function on a first image to produce a second image. The first and second images are of different dynamic ranges. The processor also applies a second tone mapping function to the second image when it contains any saturated portions. The second tone mapping function lowers luminance by a first fraction. The processor determines the overall luminance of said second image and applies a fine tuning filter when at least portions of the second image contain areas darker than an amount, where the fine tuning filter increases the overall luminance of the second image by a second fraction.

In yet a further embodiment, the second image is to be displayed on an output device having a display. In this way the processing means in the system is configured to obtain an input color gamut related to the first image and obtain an output color gamut related to said second image as it will be displayed on said output device. The processing means will then modify the output color gamut to match the input color gamut by calculating a minimized perceived color error between the input color gamut and the output color gamut.

Additional features and advantages are realized through the techniques of the present disclosure. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The present disclosure will be better understood and illustrated by means of the following embodiment and execution examples, in no way limitative, with reference to the appended figures on which.

Wherever possible, the same reference numerals will be used throughout the figures to refer to the same or like parts.

DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modification. In addition, various inventive features are described below that can each be used independently of one another or in combination with other features. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In general, chromaticity is an objective specification of the quality of a color regardless of its luminance and is often represented by two independent parameters, namely hue (h) and colorfulness. The white point of an illuminant or of a display is a neutral reference characterized by a chromaticity and all other chromaticities may be defined in relation to this reference using polar coordinates. The hue is the angular component, and the purity is the radial component, normalized by the maximum radius for that hue.

A color picture also contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color component), such as the traditional tri-chromatic RGB representation. A pixel value is represented by a vector of C values, where c is the number of components. Each value of a vector is represented with a number of bits which defines a maximal dynamic range of the pixel values.

Figure 1:
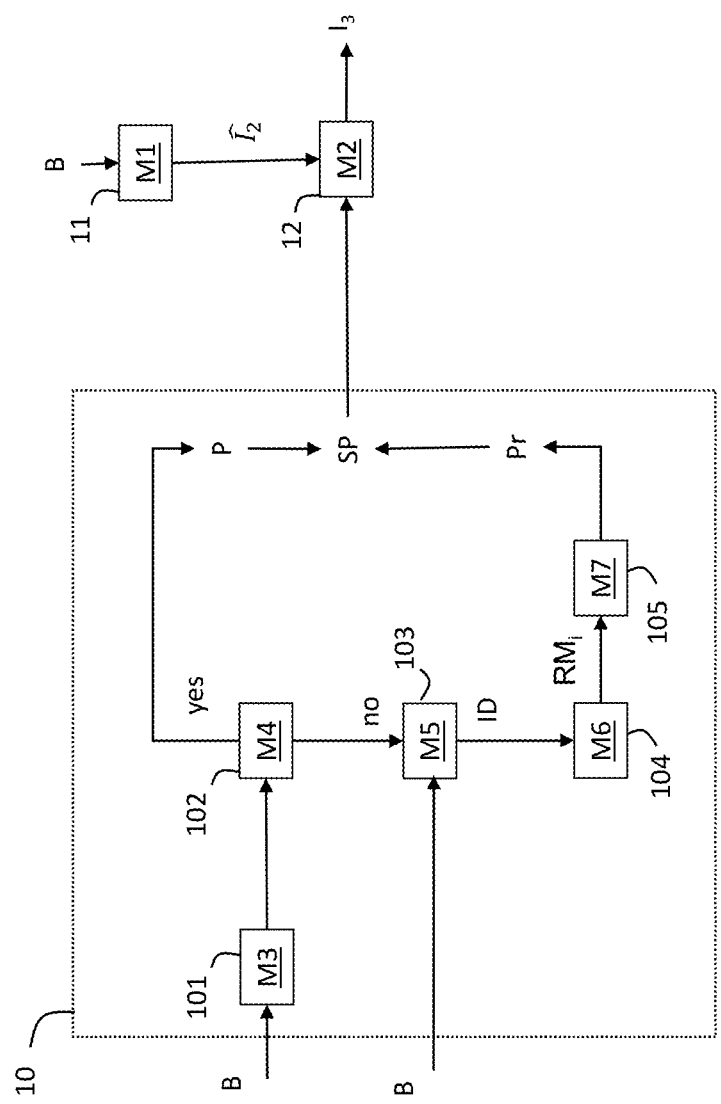
FIG. 1 is an illustration of a schematic diagram for reconstructing an image $I_3$ representative of original image $I_1$ from a decoded image $\hat{I_2}$ in accordance with an embodiment of the present principles.

FIG. 1 is an illustration of a schematic diagram for reconstructing an image $I_3$ representative of original image $I_1$ from a decoded image $\hat{I}_2$ in accordance with an example of the present principles.

In step 10, a set of parameters SP is obtained to reconstruct the image $I_3$. These parameters are either parameters P obtained from the bitstream B, or recovered parameters $P_r$ when at least one parameter P is lost, corrupted or not aligned with a decoded image $\hat{I}_2$ whose graphics or overlay is added to. In step 11, a module M1 obtains the decoded image $\hat{I}_2$ and in step 12, a module M2 reconstructs the image $I_3$ from the decoded image $\hat{I}_2$ by using the set of parameters SP. The decoded image data $\hat{I}_2$ is obtained from the bitstream (signal) B or any other bitstream and, possibly, said bitstreams may be stored on a local memory or any other storage medium. In sub-step 101 (of step 10), a module M3 obtains the parameters P required to reconstruct the image $I_3$. In sub-step 102 (of step 10), a module M4 checks if at least one of the parameters P is lost, corrupted or not aligned with the decoded image $\hat{I}_2$ whose graphics or overlay is added to. When none of the parameter P is lost, corrupted, or not aligned with the decoded image $\hat{I}_2$ whose graphics or overlay is added to, the set of parameters SP only comprises the parameters P.

When at least one of the parameters P is either lost, corrupted or not aligned with the decoded image $\hat{I}_2$ whose graphics or overlay is added to, in sub-step 103 (of step 10), a module M5 obtains an information data ID indicating how said parameters have been processed, in sub-step 104 (of step 10), a module M6 selects a recovery mode $RM_i$ according to said information data ID, and in sub-step 105 (of step 10), a module M7 recovers said at least one lost, corrupted or not aligned parameter by applying the selected recovery mode $RM_i$. The at least one recovered parameter $P_r$ is added to the set of parameters SP. In step 12, the image $I_3$ is then reconstructed taking also into account said at least one recovered parameter $P_r$. The method is advantageous because it allows to obtain parameters for a single layer based distribution solution when multiple single layer based distribution solutions share a same set of syntax elements for carrying a common set of parameters and when said single layer based distribution solutions require different recovery modes (process) for recovering lost, corrupted or not aligned parameters, guaranteeing thus the success of the reconstruction of the image $I_3$ for each of said single layer based distribution solution. The method is also advantageous when a CE device, typically a set-top-box or a player, inserts graphics on top of a decoded image $\hat{I}_2$, because the method selects a specific recovery mode to replace the not aligned parameters by parameters adapted to the decoded image $I_2$ plus the graphics (or overlay) and reconstructs the image $I_3$ by using said recovered parameters from said decoded image $\hat{I}_2$ whose graphics or overlay is added to, avoiding thus some flickering artefacts or undesired effects impacting the reconstructed image quality.

Figure 2:
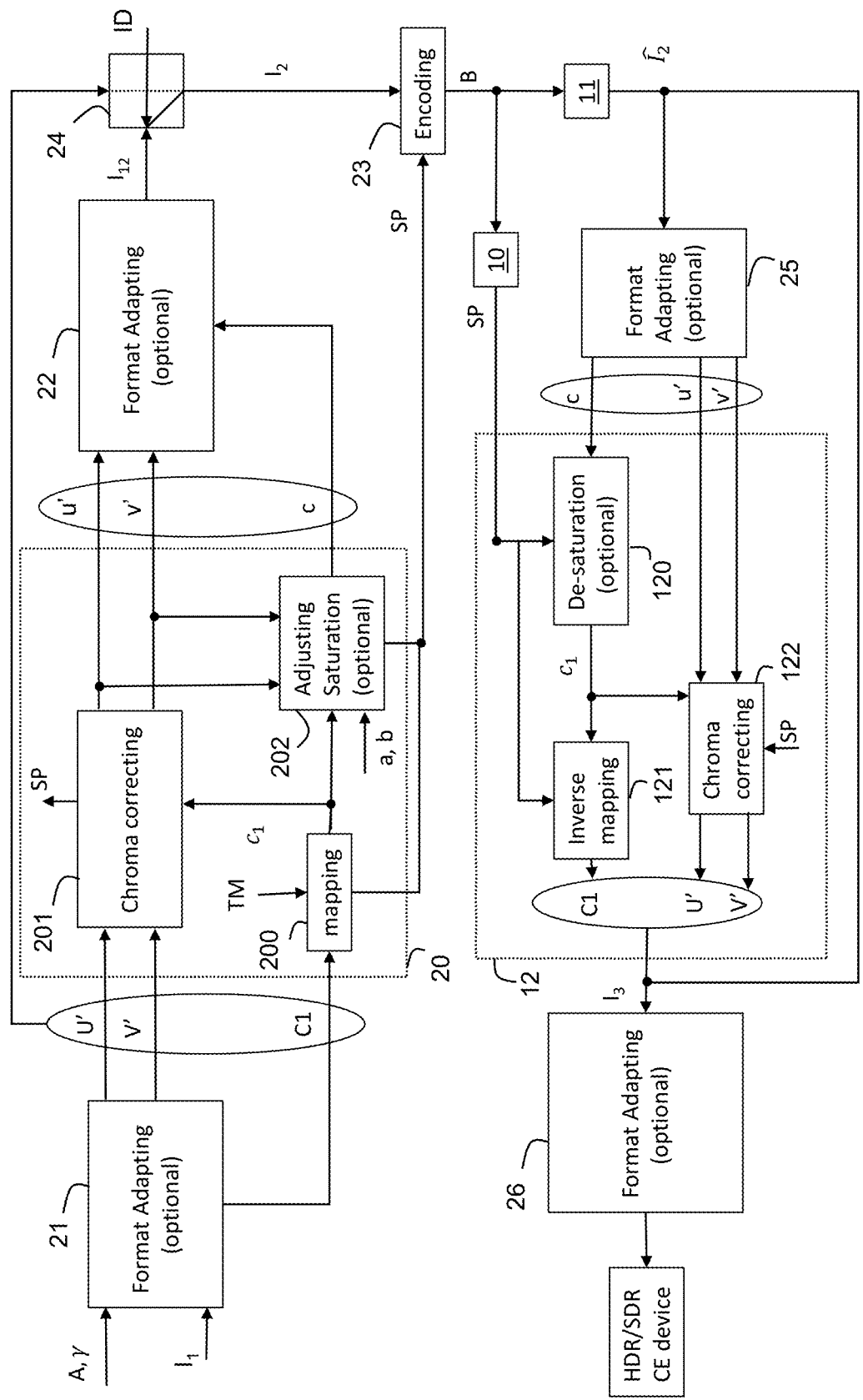
FIG. 2 is a schematic diagram showing an end-to-end workflow supporting content production and delivery to HDR and SDR enabled CE displays in accordance with an embodiment the present principles

FIG. 2 shows an end-to-end workflow supporting content production and delivery to HDR and SDR enabled CE displays in accordance with an example of the present principles. This workflow involves a single layer based distribution solution with associated metadata and illustrates an example of the use of a method for reconstructing an image $I_3$ representative of original image data $I_1$ from a decoded image data $\hat{I}_2$ and a set of parameters SP obtained in accordance with an example of the present principles illustrated in FIG. 1. Basically, this single layer based distribution solution comprises a pre-processing part and a post-processing part. At the pre-processing part, a pre-processing stage 20 decomposes the original image $I_1$ in an output image $I_{12}$ and a set of parameters SP, and a switching step 24 determines if either the original image $I_1$ or the output image $I_{12}$ is encoded in the bitstream B (step 23). In step 23, the image $I_2$ may be encoded with any legacy video codec and the bitstream B is carried throughout an existing legacy distribution network with accompanying associated metadata (set of parameters SP) conveyed on a specific channel or embedded in the bitstream B. In another embodiment, the bitstream B with accompanying metadata are stored on a storage medium such a Blu-ray disk or a memory or a register of a Set-Top-Box for example.

It should be noted that image data refer to one or several arrays of samples (pixel values) in a specific image/video format which specifies all information relative to the pixel values of an image (or a video) and all information which may be used by a display and/or any other device to visualize and/or decode a image (or video) for example. An image comprises a first component, in the shape of a first array of samples, usually representative of luminance (or luma) of the image, and a second and third component, in the shape of other arrays of samples, usually representative of the color (or chroma) of the image. Or, equivalently, the same information may also be represented by a set of arrays of color samples, such as the traditional tri-chromatic RGB representation. A pixel value is represented by a vector of C values, where C is the number of components. Each value of a vector is represented with a number of bits which defines a maximal dynamic range of the pixel values.

Standard-Dynamic-Range images (SDR images) are images whose luminance values are represented with a limited number of bits (typically 8). This limited representation does not allow correct rendering of small signal variations, in particular in dark and bright luminance ranges. In high-dynamic range images (HDR images), the signal representation is extended to maintain a high accuracy of the signal over its entire range. In HDR images, pixel values representing luminance levels are usually represented in floating-point format (typically at least 10 bits per component, namely float or half-float), the most popular format being openEXR half-float format (16-bit per RGB component, i.e. 48 bits per pixel) or in integers with a long representation, typically at least 16 bits.

The High Efficiency Video Coding (HEVC) standard (ITU-T H.265 Telecommunication standardization sector of ITU (October 2014), series H: audiovisual and multimedia systems, infrastructure of audiovisual services—coding of moving video, High efficiency video coding, Recommendation ITU-T H.265) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems. This is because some applications may need a solution based on a single layer coding/decoding process may be backward compatible, e.g. SDR compatible, and may leverage legacy distribution networks and services already in place. Such a single layer based distribution solution enables both high quality HDR rendering on HDR-enabled Consumer Electronic (CE) devices, while also offering high quality SDR rendering on SDR-enabled CE devices. Such a single layer based distribution solution generates an encoded signal, e.g. SDR signal, and associated metadata (of a few bytes per video frame or scene) that can be used to reconstruct another signal, e.g. HDR signal, from a decoded signal, e.g. SDR signal. Metadata stored parameters values used for the reconstruction of the signal and may be static or dynamic. Static metadata means metadata that remains the same for a video (set of images) and/or a program.

Static metadata are valid for the whole video content (scene, movie, clip . . . ) and may not depend on the image content. They may define, for example, image format or color space, color gamut. For instance, SMPTE ST 2086: 2014, "Mastering Display Color Volume Metadata Supporting High Luminance and Wide Color Gamut Images" is such a kind of static metadata for use in production environment. The Mastering Display Colour Volume (MDCV) SEI (Supplemental Enhanced Information) message is the distribution flavor of ST 2086 for both H.264/AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, January 2012) and HEVC video codecs. Dynamic metadata are content-dependent, that is metadata can change with the image/video content, e.g. for each image or when each group of images. As an example, SMPTE ST 2094:2016 standards families, "Dynamic Metadata for Color Volume Transform" are dynamic metadata for use in production environment. SMPTE ST 2094-30 can be distributed along HEVC coded video stream thanks to the Colour Remapping Information (CRI) SEI message.

Other single layer based distribution solutions exist on distribution networks for which display adaptation dynamic metadata are delivered along with a legacy video signal.

These single layer based distribution solutions may produce HDR 10-bits image data (e.g. image data which signal is represented as an HLG10 or PQ10 signal as specified in Rec. ITU-R BT.2100-0 "Recommendation ITU-R BT.2100-0, Image parameter values for high dynamic range television for use in production and international program exchange") and associated metadata from an input signal (typically 12 or 16 bits), encodes said HDR 10-bits image data using, for example an HEVC Main 10 profile encoding scheme, and reconstructs a video signal from a decoded video signal and said associated metadata. The dynamic range of the reconstructed signal being adapted according to the associated metadata that may depend on characteristics of a target display.

Dynamic metadata transmission in actual real-world production and distribution facilities were hard to guarantee and could be possibly lost or corrupted because of splicing, overlay layers insertion, professional equipment pruning bitstream, stream handling by affiliates and current lack of standardization for the carriage of metadata throughout the post-production/professional plant. The single layer based distribution solutions cannot work without the presence of different bunch of dynamic metadata with some of them being critical for guaranteeing the success of the reconstruction of the video signal. Similar issues may also occur when dynamic metadata are not aligned with an image whose graphics or overlay is added to. This occurs, for example, when graphics (overlays, OSD, . . . ) are inserted in (added to) an image outside the distribution chain because the metadata, computed for said image, is also applied once the graphics are inserted in (added to) the image. The metadata are then considered as being not aligned with the image whose graphics or overlay are added to because they may not be adapted to the part of said image which contains graphics or overlay. These issues might be characterized by image flickering on fixed portion of graphics when the decoded image is displayed over time or by undesirable effects (saturation, clipping . . . ) on portion of the image containing graphics or overlay processed with inappropriate metadata (e.g. bright OSD processed by metadata generated for a dark content).

Referring back to FIG. 1, the accompanying associated metadata is carried by another specific channel or store on a separate storage medium. Preferably, the video is coded with H.265/HEVC codec (*ITU-T H.265 Telecommunication standardization sector of ITU (October 2014), series H: audiovisual and multimedia systems, infrastructure of audiovisual services—coding of moving video, High efficiency video coding, Recommendation ITU-T H.265*) or *H.264/AVC* (*"Advanced video coding for generic audiovisual Services"*, SERIES H: AUDIOVISUAL AND MULTIMEDIA SYSTEMS, Recommendation ITU-T H.264, Telecommunication Standardization Sector of ITU, January 2012). In the case the information data ID determines that the original image $I_1$ (possibly represented by the components (C1,U', V') or a Y'CbCr 4:2:0 PQ10 or HLG10 video signal) is encoded in step 23, said original image $I_1$ may be encoded with the HEVC Main 10 profile. In the case the information data ID determines that the output image $I_{12}$ is encoded in step 23, the output image $I_{12}$, which can be represented as a Y'CbCr 4:2:0 gamma transfer characteristics (Standard Dynamic Range) signal may be encoded with any HEVC profile including Main 10 or Main profiles. The information data ID may be also conveyed as associated metadata (step 23). At the post-processing part, a decoded image $\hat{I}_2$ is obtained from the bitstream B (step 11), a set of parameters SP is obtained as explained in FIG. 1, step 10, and a post-processing stage 12, which is the functional inverse of the pre-processing stage 20, reconstructs an image $I_3$ from the decoded image $\hat{I}_2$ and the set of parameters SP. This single layer based distribution solution may also comprise optional format adapting steps 21, 22, 25, 26. For example, in step 21 (optional), the format of the original image $I_1$ may be adapted to a specific format (C1,U',V') of the input of the pre-processing stage 20, and in step 22 (optional), the format (c, u', v') of the output image $I_{12}$ may also be adapted to a specific output format before encoding. In step 25, the format of the decoded image $\hat{I}_2$ may be adapted to a specific format of the input of the post-processing stage 12, and in step 26, the image $I_3$ may be adapted to at least one characteristic of a targeted apparatus (e.g. a Set-Top-Box, a connected TV, HDR/SDR enabled CE device, a Blu-ray disc player) and/or an inverse gamut mapping may be used when the decoded image $\hat{I}_2$ and the image $I_3$ or the original image $I_1$ are represented in different color spaces and/or gamut.

The format adaptation of the above mentioned steps, 21, 22, 25, and 26 may also include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc. Note that the well-known YUV color space refers also to the well-known YCbCr in the prior art. Annex E of the recommendation ETSI recommendation ETSI TS 103 433 V1.1.1, release 2016-8, provides an example of format adapting processes and inverse gamut mapping (Annex D). The input format adaptation step 21 may also include adapting the bit depth of the original image $I_1$ to specific bit depth such as 10 bits for example, by applying a transfer function on the original image $I_1$. For example, a PQ or HLG transfer function may be used (Rec. ITU-R BT.2100-0).

In one embodiment, the pre-processing stage 20 comprises steps 200-202. In step 200, a first component c1 of the output image $I_{12}$ is obtained by mapping a first component C1 of the original image $I_1$:

$$c_1 = TM(C1)$$

with TM being a mapping function. The mapping function TM may reduce or increase the dynamic range of the luminance of the original image $I_1$ and its inverse may increase or reduce the dynamic range of the luminance of an image.

In one embodiment, in step 201, a second and third component u', v' of the output image $I_{12}$ are derived by correcting second and third components U', V' of the original image $I_1$ according to the first component $c_1$. The correction of the chroma components may be maintained under control by tuning the parameters of the mapping. The color saturation and hue are thus under control. According to an embodiment of step 201, the second and third components U' and V' are divided by a scaling function $\beta_0(c_1)$ whose value depends on the first component $c_1$. Mathematically speaking, the second and third components u', v' are given by:

$$\begin{bmatrix} u' \\ v' \end{bmatrix} = \frac{1}{\beta_0(c_1)} \cdot \begin{bmatrix} U' \\ V' \end{bmatrix}$$

Optionally, in step 202, the first component $c_1$ may be adjusted to further control the perceived saturation, as follows:

$$c = c_1 - \max(0, a \cdot u' + b \cdot v')$$

where a and b are two parameters of the set of parameters SP. This step 202 allows to control the luminance of the output image $I_{12}$ to guarantee the perceived color matching between the colors of the output image $I_{12}$ and the colors of the original image $I_1$. The set of parameters SP may comprise parameters relative to the mapping function TM or its inverse ITM, the scaling function $\beta_0(c_1)$. These parameters are associated with dynamic metadata and carried in a bitstream, for example the bitstream B. The parameters a and b may also be carried in a bitstream.

In one embodiment, at the post-processing part, in step 10, a set of parameters SP is obtained as explained in FIG. 1. According to an embodiment of step 10, the set of parameters SP is carried by static/dynamic metadata obtained from a specific channel or from a bitstream, including the bitstream B, possibly store on a storage medium. In step 11, the module M1 obtains a decoded image $\hat{I}_2$ by decoding the bitstream B and the decoded image $\hat{I}_2$ is then available for either an SDR or HDR enabled CE display. In more details, the post-processing stage 12 comprises steps 120-122. In optional step 120, the first component c of the decoded image $\hat{I}_2$ may be adjusted as follows:

$$c_1 = c + \max(0, a \cdot u' + b \cdot v')$$

where a and b are two parameters of the set of parameters SP. In step 121, the first component C1 of the image $I_3$ is obtained by inverse-mapping the first component $c_1$:

$$C_1 = \text{ITM}(c_1)$$

In step 122, the second and third component U', V' of the image $I_3$ are derived by inverse correcting the second and third components u', v' of the decoded image $\hat{I}_2$ according to the component $c_1$. According to an embodiment, a second and third components u' and v' are multiplied by a scaling function $\beta_0(c_1)$ whose value depends on the first component $c_1$. Mathematically speaking, the two first and second components U', V' are given by:

$$\begin{bmatrix} U' \\ V' \end{bmatrix} = \beta_0(c_1) \cdot \begin{bmatrix} u' \\ v' \end{bmatrix}$$

Figure 3:
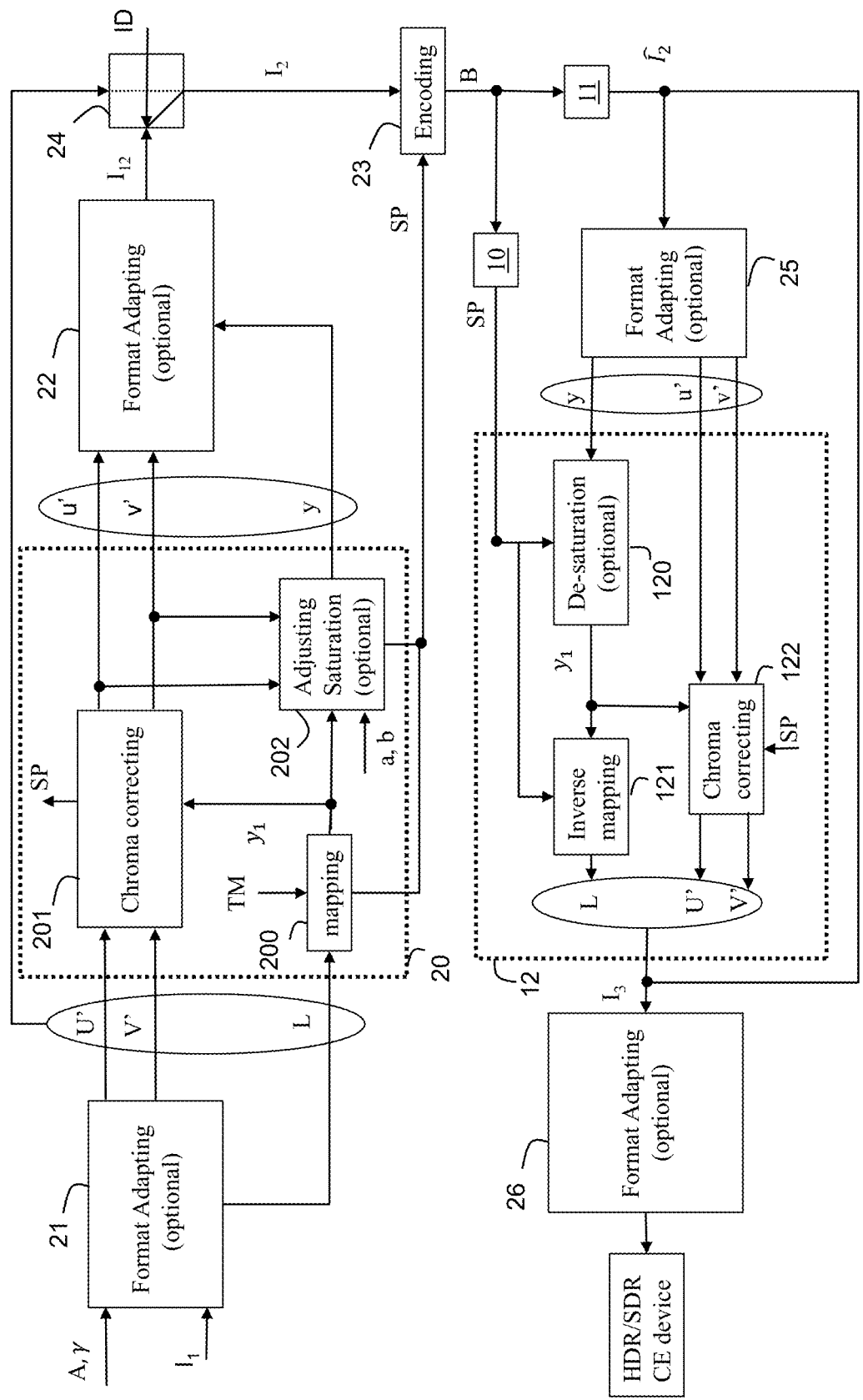
FIG. 3 is an alternate embodiment of the diagram of FIG. 2.

According to a first embodiment of the method of FIG. 2, as illustrated in FIG. 3, at the pre-processing part, the first component C1 of the original image $I_1$ is a linear-light luminance component L obtained from the RGB component of the original image $I_1$ by:

$$C1 = L = A_1 \begin{bmatrix} R \\ G \\ B \end{bmatrix}$$

and the second and third component U', V' are derived by applying a pseudo-gammatization using square-root (close to BT.709 OETF) to the RGB components of the original image $I_1$:

$$\begin{bmatrix} U' \\ V' \end{bmatrix} = \begin{bmatrix} A_2 \\ A_3 \end{bmatrix} \begin{bmatrix} \sqrt{R} \\ \sqrt{G} \\ \sqrt{B} \end{bmatrix} \times 1024$$

In step 200, the first component $y_1$ of the output image $I_{12}$ is obtained by mapping said linear-light luminance component L:

$$y_1 = \text{TM}(L)$$

In step 201, the second and third component u', v' of the output image $I_{12}$ are derived by correcting the first and second components U', V' according to the first component $y_1$. At the post-processing part, in step 121, a linear-light luminance component L of the image $I_3$ is obtained by inverse-mapping the first component $c_1$:

$$L = \text{ITM}(y_1)$$

In step 122, the second and third component U', V' of the image $I_3$ are derived by inverse correcting the second and third components u', v' of the output image $I_{12}$ according to the first component $y_1$. According to an embodiment of step 122, the second and third components u' and v' are multiplied by a scaling function $\beta_0(y_1)$ whose value depends on the first component $y_1$. Mathematically speaking, the two first and second components U', V' are given by:

$$\begin{bmatrix} U' \\ V' \end{bmatrix} = \beta_0(y_1) \cdot \begin{bmatrix} u' \\ v' \end{bmatrix}$$

Figure 4:
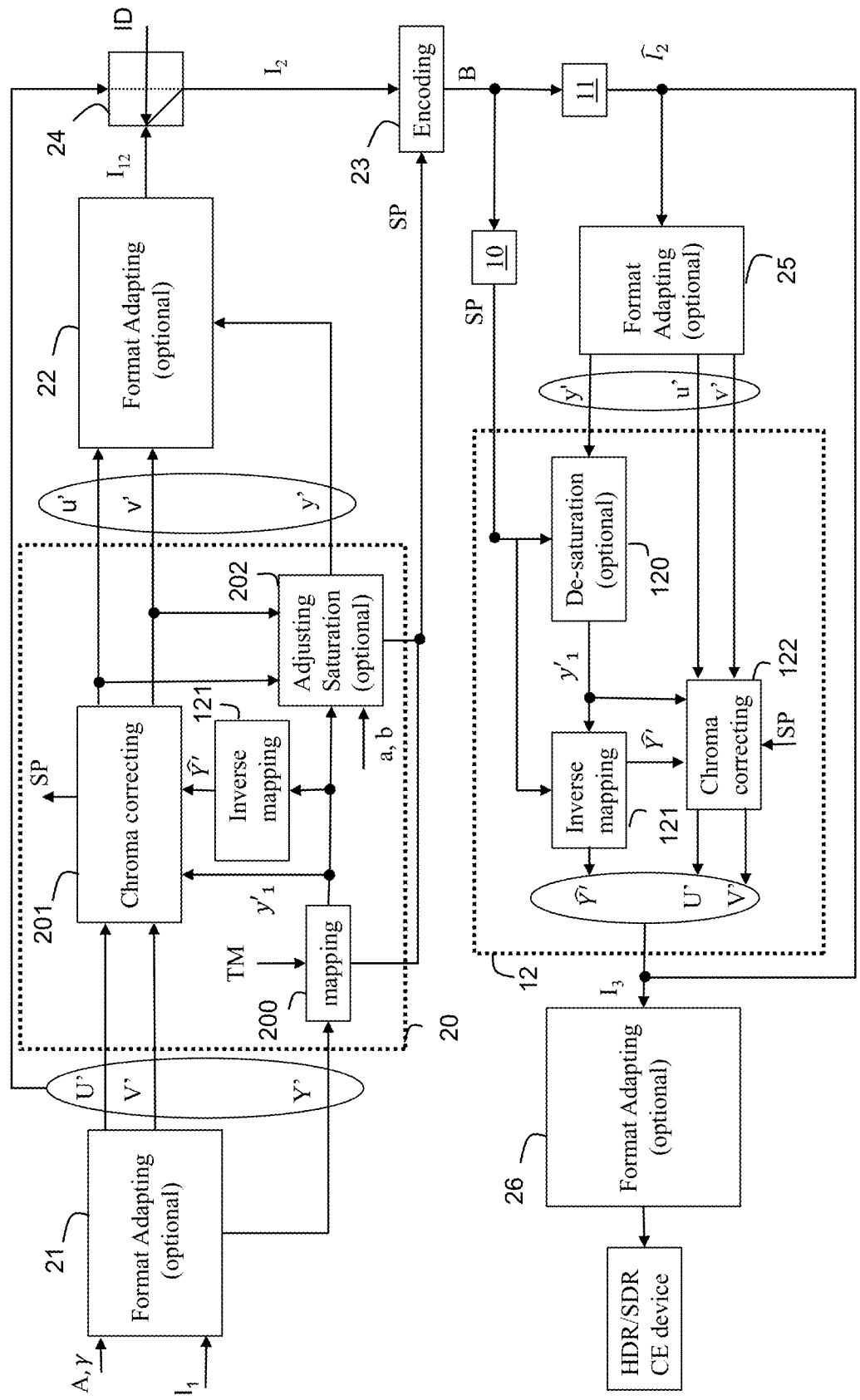
FIG. 4 is an alternate embodiment of the end-to-end workflow as show in FIG. 2.

According to a second embodiment of the method of FIG. 2, as illustrated in FIG. 4, at the pre-processing part, the first component C1 of the original image $I_1$ is a component Y' obtained from the gamma-compressed RGB components of the original image $I_1$ by:

$$Y' = A_1 \begin{bmatrix} R' \\ G' \\ B' \end{bmatrix}$$

and the second and third component U', V' by applying a gammatization to the RGB components of the original image $I_1$:

$$\begin{bmatrix} U' \\ V' \end{bmatrix} = \begin{bmatrix} A_2 \\ A_3 \end{bmatrix} \begin{bmatrix} R' \\ G' \\ B' \end{bmatrix} \times 1024$$

where γ may be a gamma factor, preferably equal to 2.4. Note, the component Y', which is a non-linear signal, is different of the linear-light luminance component L.

In step 200, the first component $y'_1$ of the output image $I_{12}$ is obtained by mapping said component Y':

$$y'_1 = \text{TM}(Y')$$

In step 121, a reconstructed component $\widehat{Y'}$ is obtained by inverse-mapping the first component $y'_1$:

$$\widehat{Y'} = \text{ITM}(y'_1)$$

where ITM is the inverse of the mapping function TM. The values of the reconstructed component $\widehat{Y'}$ belong thus to the dynamic range of the values of the component Y'.

In step 201, the second and third component u', v' of the output image $I_{12}$ are derived by correcting the first and second components U', V' according to the first component $y'_1$ and the reconstructed component $\widehat{Y'}$. This step (201)

allows to control the colors of the output image $I_{12}$ and guarantees their matching to the colors of the original image $I_1$. The correction of the chroma components may be maintain under control by tuning the parameters of the mapping (inverse mapping). The color saturation and hue are thus under control. Such a control is not possible, usually, when a non-parametric perceptual transfer function is used. According to an embodiment of step 201, the second and third components U' and V' are divided by a scaling function $\beta_0(y'_1)$ whose value depends on the ratio of the reconstructed component $\hat{Y}'$ over the component $y'_1$:

$$\beta_0(y'_1) = \frac{ITM(y'_1) \cdot \Omega}{y'_1} = \frac{\hat{Y}' \cdot \Omega}{y'_1}$$

with $\Omega$ is constant value depending on the color primaries of the original image $I_1$ (equals to 1.3 for BT.2020 for example). At the post-processing part, in step 121, a component $\hat{Y}'$ of the image $I_3$ is obtained by inverse-mapping the first component $y'_1$:

In step 122, the second and third component U', V' of the image $I_3$ are derived by inverse correcting the second and third components u', v' of the decoded image $\hat{I}_2$ according to the first component $y'_1$ and the component $\hat{Y}'$. According to an embodiment of step 122, a second and third components u' and v' are multiplied by the scaling function $\beta_0(y'_1)$. Mathematically speaking, the two first and second components U', V' are given by:

$$\begin{bmatrix} U' \\ V' \end{bmatrix} = \beta_0(y'_1) \cdot \begin{bmatrix} u' \\ v' \end{bmatrix}$$

The mapping function, TM, based on a perceptual transfer function, whose goal is to convert a component of an original image $I_1$ into a component of an output image $I_{12}$, thus reducing (or increasing) the dynamic range of the values of their luminance. The values of a component of an output image $I_{12}$ belong thus to a lower (or greater) dynamic range than the values of the component of an original image $I_1$. The perceptual transfer function uses a limited set of control parameters.

Figure 5A:
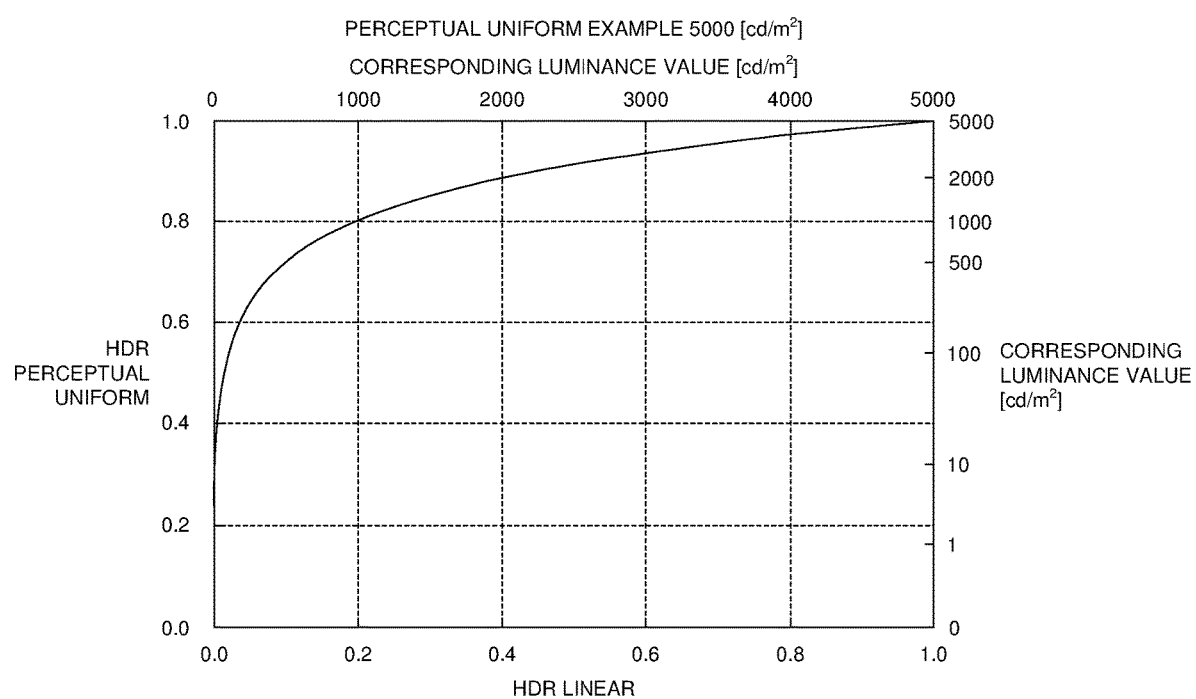
FIG. 5*a* is an example illustrating a perceptual transfer function.
Figure 5B:
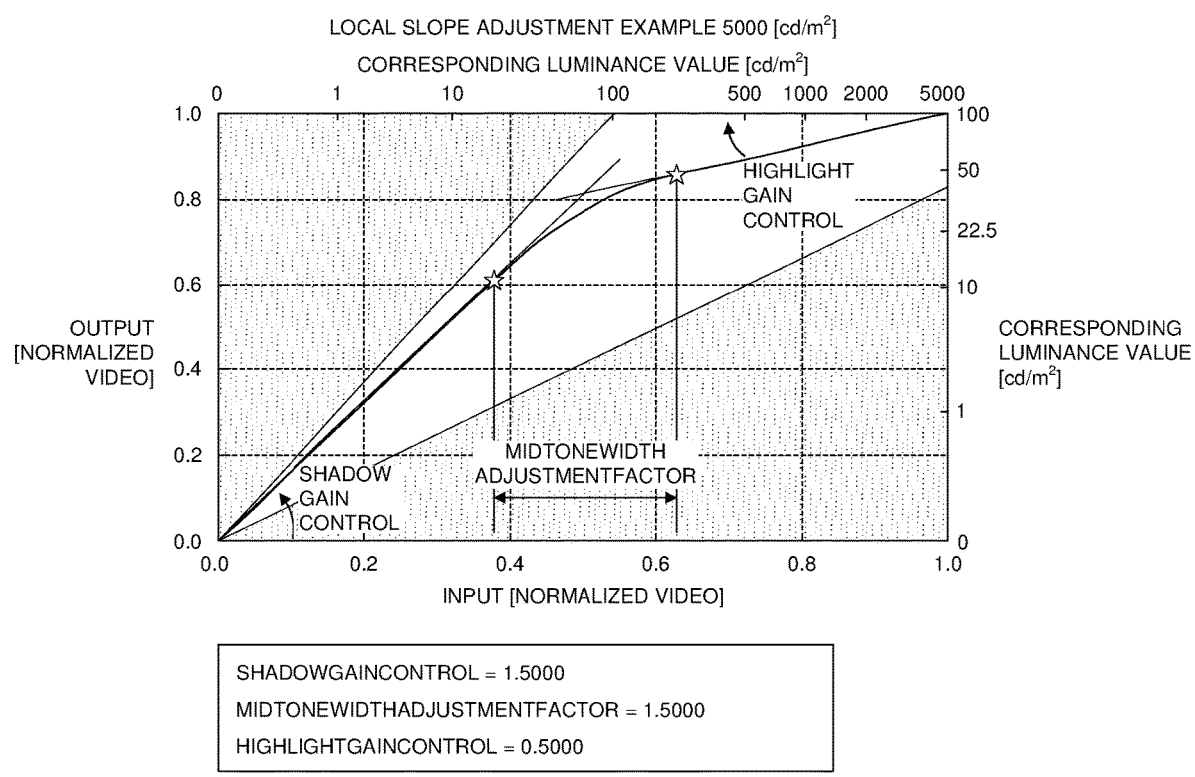
FIG. 5*b* is an example illustrating a piece-wise curve used for mapping.

FIG. 5a is an illustration of a perceptual transfer function which may be used for mapping luminance components but a similar perceptual transfer function for mapping luma components may be used. The mapping is controlled by a mastering display peak luminance parameter (equal to 5000 cd/m² in FIG. 5a). To better control the black and white levels, a signal stretching between content-dependent black and white levels is applied. Then the converted signal is mapped using a piece-wise curve constructed out of three parts, as illustrated in FIG. 5b. The lower and upper sections are linear, the steepness being determined by the shadowGain and highlightGain parameters respectively. The mid-section is a parabola providing a smooth bridge between the two linear sections. The width of the cross-over is determined by the midToneWidthAdjFactor parameter. All the parameters controlling the mapping may be conveyed as metadata for example by using a SEI message as defined in JCTVC-W0133 to carry the SMPTE ST 2094-20 metadata.

Figure 5C:
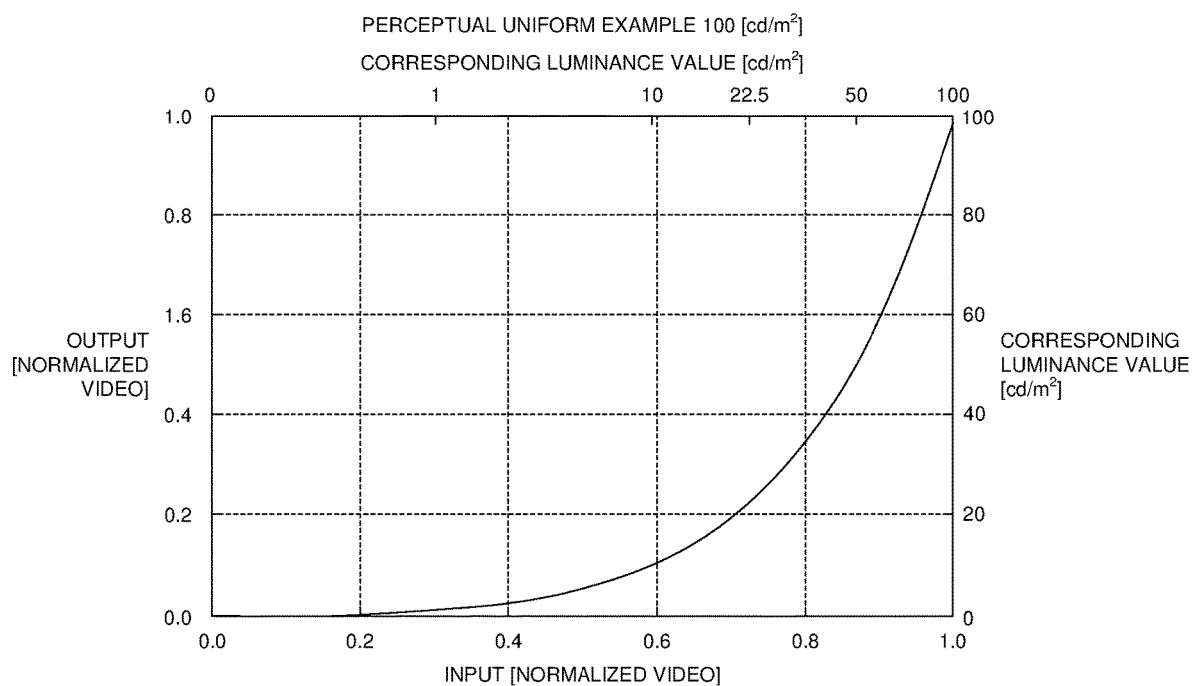
FIG. 5c is an example illustrating a curve used for converting back a signal to a linear light domain.

FIG. 5c provides an example of the inverse of the perceptual transfer function TM (FIG. 5a) to illustrate how a perceptual optimized video signal may be converted back to the linear light domain based on a targeted legacy display maximum luminance, for example 100 cd/m². In step 10 (FIG. 1), the set of parameters SP is obtained to reconstruct an image $I_3$ from a decoded image $\hat{I}_2$. These parameters may be obtained from metadata obtained from a bitstream, for example the bitstream B. The recommendation ETSI TS 103 433 V1.1.1 clause 6, 2016-08 provides an example of syntax of said metadata. The syntax of the recommendation ETSI TS 103 433 v1.1.1 is described for reconstructing an HDR video from an SDR video but this syntax may extend to the reconstruction of any image $I_3$ from any decoded image $\hat{I}_2$. The post-processing (step 12) operates on an inverse mapping function ITM and a scaling function $\beta_0(.)$ that are derived from dynamic metadata because they depend on the first component $c_1$.

According one embodiment based on the recommendation ETSI TS 103 433 V1.1.1, the dynamic metadata may be conveyed according to either a so-called parameter-based mode or a table-based mode. The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams. In the parameter-based mode, dynamic metadata to be conveyed are luminance mapping parameters representative of the inverse function ITM, i.e.
  tmInputSignalBlackLevelOffset;
  tmInputSignalWhiteLevelOffset;
  shadowGain;
  highlightGain;
  midToneWidthAdjFactor;
  tmOutputFineTuning parameters;

Moreover, other dynamic metadata to be conveyed are color correction parameters (saturationGainNumVal, saturationGainX(i) and saturationGainY(i)) used to define the function $\beta_0(.)$ (ETSI recommendation ETSI TS 103 433 V1.1.1 clauses 6.3.5 and 6.3.6). The parameters a and b may be respectively carried/hidden in the saturationGain function parameters as explained above. These dynamic metadata may be conveyed using the HEVC Colour Volume Reconstruction Information (CVRI) user data registered SEI message whose syntax is based on the SMPTE ST 2094-20 specification (recommendation ETSI TS 103 433 V1.1.1 Annex A.3). Typical dynamic metadata payload is about 25 bytes per scene. In step 101, the CVRI SEI message is parsed the SEI message to obtain mapping parameters and color-correction parameters. In step 12, the inverse mapping function ITM (so-called lutMapY) is reconstructed (derived) from the obtained mapping parameters (see recommendation ETSI TS 103 433 V1.1.1 clause 7.2.3.1 for more details). In step 12, the scaling function $\beta_0(.)$ (so-called lutCC) is also reconstructed (derived) from the obtained color-correction parameters (see recommendation ETSI TS 103 433 V1.1.1 clause 7.2.3.2 for more details).

In the table-based mode, dynamic data to be conveyed are pivots points of a piece-wise linear curve representative of the inverse mapping function ITM. For example, the dynamic metadata are luminanceMappinNumVal that indicates the number of the pivot points, luminanceMappingX that indicates the x values of the pivot points, and luminanceMappingY that indicates the y values of the pivot points (see recommendation ETSI TS 103 433 V1.1.1 clauses 6.2.7 and 6.3.7 for more details). Moreover, other dynamic metadata to be conveyed may be pivots points of a piece-wise linear curve representative of the scaling function $\beta_0(.)$. For example, the dynamic metadata are colorCorrectionNumVal that indicates the number of pivot points, colorCorrectionX that indicates the x values of pivot points, and colorCorrectionY that indicates the y values of the pivot points (see the recommendation ETSI TS 103 433 V1.1.1 clauses 6.2.8 and 6.3.8 for more details). These dynamic metadata may be conveyed using the HEVC Colour Remapping Information (CRI) SEI message whose syntax is based on the SMPTE ST 2094-30 specification (recommendation ETSI TS 103 433 V1.1.1 Annex A.4). Typical payload is about 160 bytes per scene. In step 102, the CRI (Colour Remapping Information) SEI message (as specified in HEVC/H.265 version published in December 2016) is parsed to obtain the pivot points of a piece-wise linear curve representative of the inverse mapping function ITM and the pivot points of a piece-wise linear curve representative of the scaling function $\beta_0(.)$, and the chroma to luma injection parameters a and b.

In step 12, the inverse mapping function ITM is derived from those of pivot points relative to a piece-wise linear curve representative of the inverse mapping function ITM (see recommendation ETSI TS 103 433 V1.1.1 clause 7.2.3.3 for more details). In step 12, the scaling function $\beta_0(.)$, is also derived from those of said pivot points relative to a piece-wise linear curve representative of the scaling function $\beta_0(.)$, (see recommendation ETSI TS 103 433 V1.1.1 clause 7.2.3.4 for more details). Note that static metadata also used by the post-processing stage may be conveyed by SEI message. For example, the selection of either the parameter-based mode or table-based mode may be carried by the Information (TSI) user data registered SEI message (payloadMode) as defined by the recommendation ETSI TS 103 433 V1.1.1 (clause A.2.2). Static metadata such as, for example, the color primaries or the maximum display mastering display luminance are conveyed by a Mastering Display Colour Volume (MDCV) SEI message as defined in AVC, HEVC.

According an embodiment of step 103, the information data ID is explicitly signaled by a syntax element in a bitstream and thus obtained by parsing the bitstream. For example, said syntax element is a part of an SEI message. According to an embodiment, said information data ID identifies what is the processing applied to the original image $I_1$ to process the set of parameters SP. According to this embodiment, the information data ID may then be used to deduce how to use the parameters to reconstruct the image $I_3$ (step 12). For example, when equal to 1, the information data ID indicates that the parameters SP have been obtained by applying the pre-processing stage (step 20) to an original HDR image $I_1$ and that the decoded image $\hat{I}_2$ is a SDR image. When equal to 2, the information data ID indicates that the parameters have been obtained by applying the pre-processing stage (step 20) to an HDR10 bits image (input of step 20), that the decoded image $\hat{I}_2$ is a HDR10 image, and the mapping function TM is a PQ transfer function. When equal to 3, the information data ID indicates that the parameters have been obtained by applying the pre-processing stage (step 20) to a HDR10 image (input of step 20), that the decoded image $\hat{I}_2$ is an HLG10 image, and the mapping function TM is a HLG transfer function to the original image $I_1$.

According to an embodiment of step 103, the information data ID is implicitly signaled. For example, the syntax element transfer-characteristics present in the VUI of HEVC (annex E) or AVC (annex E) usually identifies a transfer function (mapping function TM) to be used. Because different single layer distribution solutions use different transfer function (PQ, HLG, . . . ), the syntax element transfer-characteristics may be used to identify implicitly the recovery mode to be used.

The information data ID may also be signaled by a service defined at a higher transport or system layer. In accordance with another example, a peak luminance value and the color space of the image $I_3$ may be obtained by parsing the MDCV SEI message carried by the bitstream, and the information data ID may be deduced from specific combinations of peak luminance values and color spaces (color primaries).

According to an embodiment of step 102, a parameter P is considered as being lost when it is not present in (not retrieved from) the bitstream. For example, when the parameters P are carried by SEI message such as the CVRI or CRI SEI messages as described above, a parameter P is considered as being lost (not present) when the SEI message is not transmitted in the bitstream or when the parsing of the SEI message fails. According to an embodiment of step 103, a parameter P is considered as being corrupted when at least one of the following conditions is fulfilled:

its value is out of a determined range of values (e.g. saturation_gain_num_val equal to 10 when the compliant range is 0 to 6);

said parameter does not have a coherent value according to other parameter values (e.g. saturation_gain_y[i] contains an outlier i.e. a value that is far from other saturation_gain_y[i] values; typically saturation_gain[0] until saturation_gain[4] are equal to value in the range of 0 to 16 and saturation_gain[1]=255).

According to an embodiment of the method, a recovery mode $RM_i$ is to replace all the parameters P by recovered parameters $P_r$, even if only some of the parameters P are not corrupted, lost or not aligned with the decoded image $\hat{I}_2$ (whose graphics or overlay is added to). According to an embodiment of the method, another recovery mode $RM_i$ is to replace each lost, corrupted or not aligned parameter P by a recovered parameter $P_r$. According to an embodiment of the method, a recovery mode $RM_i$ is to replace a lost, corrupted or not aligned parameter P by a value of a set of pre-determined parameter values previously stored. For example, a set of pre-determined parameter values may gather a pre-determined value for at least one metadata carried by the CRI and/or CVRI SEI message. A specific set of pre-determined parameter values may be determined, for example, for each single layer based distribution solution identified by the information data ID.

Table 1 (below) provides for an illustration of a non-limitative example of specific set of predetermined values for 3 different single layer based distribution solutions.

TABLE 1

| Information data ID | ETSI TS 103 433 parameters |
|---|---|
| 0 | Shadow gain: 1.16 |
|  | Highlight gain: 2.0 |
|  | MidTones Adjustment: 1.5 |
|  | White stretch: 0 |
|  | Black stretch: 0 |
|  | Saturation Gain [ ]: {(0, 64); (24, 64); (62, 59); (140, 61); (252, 64); (255, 64)} |
| 1 | Shadow gain: 1.033 |
|  | Highlight gain: 2.0 |
|  | MidTones Adjustment: 1.5 |
|  | White stretch: 0 |
|  | Black stretch: 0 |

TABLE 1-continued

| Information data ID | ETSI TS 103 433 parameters |
| --- | --- |
| 2 | Shadow gain: 1.115<br>Highlight gain: 2.0<br>MidTones Adjustment: 1.5<br>White stretch: 0 |

According to the Table 1, three different sets of predetermined values are defined according to the information data ID. These sets of predetermined values defined recovered values for some parameters used by the post-processing stage. The other parameters being set to fixed values that are common to the different single layer solutions.

According to an embodiment of step 104, a recovery mode $RM_i$ is selected according to either at least one characteristic of the original video (image $I_1$), typically the peak luminance of the original content, or of a mastering display used to grade the input image data or the image data to be reconstructed, or at least one characteristic of another video, typically the peak luminance of the reconstructed image $I_3$, or of a target display.

According to an embodiment, a recovery mode RMi is to check if a characteristic of the original video ($I_1$) or of a mastering display used to grade the input image data or the image data to be reconstructed (e.g. a characteristic as defined in ST 2086) is present and to compute at least one recovered parameter from said characteristic. If said characteristic of the input video is not present and a characteristic of a mastering display is not present, one checks if a characteristic of the reconstructed image $I_3$ or of the target display is present (e.g. the peak luminance as defined in CTA-861.3) and computes at least one recovered parameter from said characteristic. If said characteristic of the reconstructed image $I_3$ is not present and said characteristic of the target display is not present, at least one recovered parameter is a fixed value (e.g. fixed by a video standardization committee or an industry forum such as, for example 1000 cd/m2).

In accordance with a non-limitative example, Table 2 provides examples of recovery values for some parameters used by the post-processing stage that depends on the presence of available information on the input/output content and mastering/target displays.

TABLE 2

| Syntax element | Recovery value |
| --- | --- |
| matrix_coefficient_value[i] | {889; 470; 366; 994}, if BT.2020<br>{915; 464; 392; 987}, if BT.709 |
| shadow_gain_control | if MDCV SEI message is present, recovery mode 1 otherwise recovery mode 2 |

The parameters matrix_coefficient_value[i] may be set according to the input/output video color space, BT.709 or BT.2020 (characteristic of the input or output video) obtained by parsing a MDCV SEI/ST 2086 message if present. The recovery mode depends on said color spaces. The parameter shadow_gain_control may be computed according to a value obtained by parsing a MDCV SEI/ST 2086 message if present. For example, an information representative of the peak luminance of a mastering display is obtained from said MDCV SEI/ST 2086 message and the parameter shadow_gain_control is computed by (recovery mode 1):

$$shadow\_gain\_control = Clip(0; 255; Floor(rs(hdrDisplayMaxLuminance) \times 127.5 + 0.5))$$ with $$r_s(x) = \frac{7.5}{\ln\left(1 + 4.7x\left(\frac{x}{100}\right)^{1/2.4}\right)} - 2 \text{ and } Clip3(x; y; z) \begin{cases} x, z < x \\ y, z > y \\ z \text{ otherwise} \end{cases}$$

It is likely that at a service level information or for a specific workflow the value of hdrDisplayMaxLuminance is known. This value may also be set to the peak luminance of a target (presentation) display when this characteristic is available. Otherwise (recovery mode 2), it is arbitrarily set to a default value, typically 1000 cd/m2. This default value corresponds to a currently observed reference maximum display mastering luminance in most of the current HDR markets.

Figure 6:
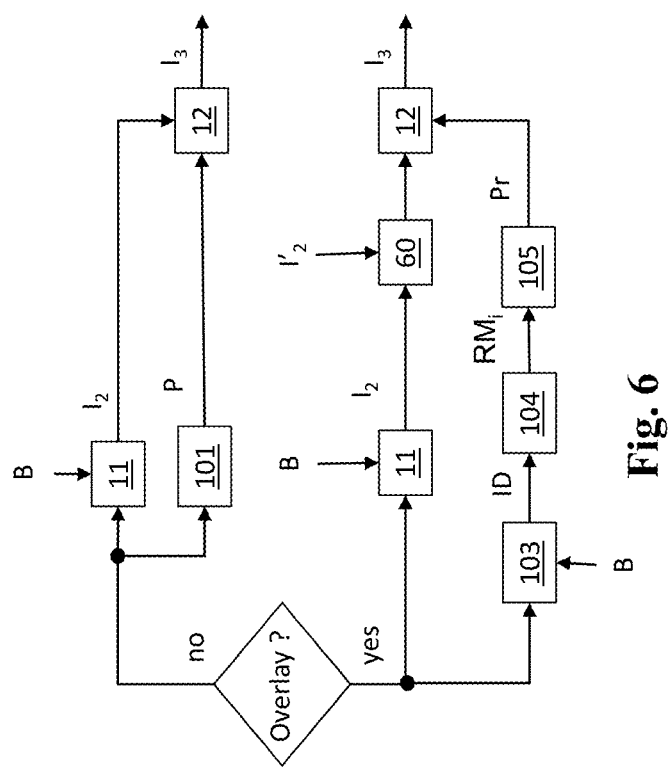
FIG. 6 is a flow diagram illustrating another example of reconstructing an image from a decoded image data and parameters obtained from a bitstream in accordance with an embodiment of the present principles.

FIG. 6 shows another example of the use of a method for reconstructing an image $I_3$ from a decoded image data $\hat{I}_2$ and a set of parameters SP obtained from a bitstream B in accordance with an example of the present principles. This example is intended to be implemented, at least partially, in any (mid-)device implementing an overlay inserting and mixing mechanism (e.g. Set-Top-Box or UltraHD Blu-ray player) and signaling/sending an event (typically an overlay_present_flag set to 1) to a decision module that an overlay has to be added to the decoded image $\hat{I}_2$. When an overlay (graphics) has not to be added to a decoded image $\hat{I}_2$, the set of parameters SP is obtained (step 10), the decoded image $\hat{I}_2$ is obtained (step 11) and the image $I_3$ is reconstructed (step 12) as described in FIG. 1.

When an overlay has to added to a decoded image $\hat{I}_2$, the decoded image $\hat{I}_2$ is obtained (step 11) and, in step 60, a composite image I'$_2$ is obtained by adding graphics (overlay) to the decoded image $\hat{I}_2$. The information data ID is then obtained (step 103), a recovery mode selected (step 104) and the selected recovery mode RMi applies (step 105) to obtain recovered parameters $P_r$. The image $I_3$ is then reconstructed (step 12) from the recovered parameters $P_r$ and the decoded image $\hat{I}_2$.

According to an embodiment, the parameters Pr are obtained by training a large set of images of different aspects (bright, dark, with logos and other alternative embodiments). Optionally (not shown in FIG. 6), the step 12 may be implemented in a remote device such a TV set. In that case, either the decoded image $\hat{I}_2$ plus the parameters P or the composite image I'$_2$ plus the parameters Pr are transmitted to said TV set. In FIGS. 1 through 6, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 7:
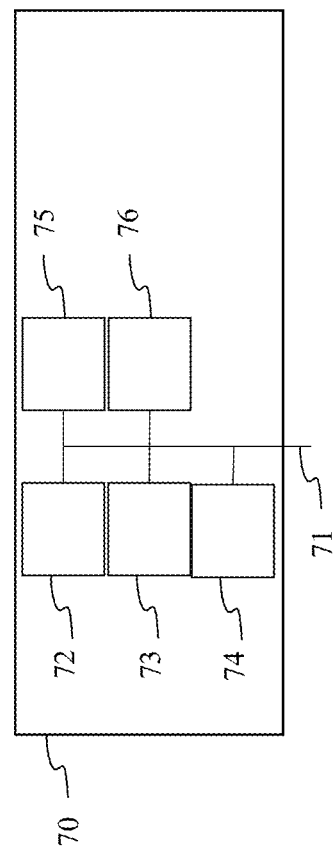
FIG. 7 is a schematic diagram illustrating an architecture of a device in accordance with an embodiment of present principles.

FIG. 7 represents an exemplary architecture of a device 70 which may be configured to implement a method described in relation with FIG. 1-6.

Device 70 comprises following elements that are linked together by a data and address bus 71:
- a microprocessor 72 (or CPU), which is, for example, a DSP (or Digital Signal Processor);
- a ROM (or Read Only Memory) 73;
- a RAM (or Random Access Memory) 74;
- an I/O interface 75 for reception of data to transmit, from an application; and
- a battery 76

In accordance with an example, the battery 76 is external to the device. In each of mentioned memory, the word «register» used in the specification can correspond to area of small capacity (some bits) or to very large area (e.g. a whole program or large amount of received or decoded data). The ROM 73 comprises at least a program and parameters. The ROM 73 may store algorithms and instructions to perform techniques in accordance with present principles. When switched on, the CPU 72 uploads the program in the RAM and executes the corresponding instructions.

RAM 64 comprises, in a register, the program executed by the CPU 72 and uploaded after switch on of the device 70, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example, the input video or an original image of an input video is obtained from a source. For example, the source belongs to a set comprising:
- a local memory (73 or 74), e.g. a video memory or a RAM (or Random Access Memory), a flash memory, a ROM (or Read Only Memory), a hard disk;
- a storage interface (75), e.g. an interface with a mass storage, a RAM, a flash memory, a ROM, an optical disc or a magnetic support;
- a communication interface (75), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with examples, the bitstreams carrying on the metadata are sent to a destination. As an example, one of these bitstream or both are stored in a local or remote memory, e.g. a video memory (74) or a RAM (74), a hard disk (73). In a variant, at least one of the bitstreams is sent to a storage interface (75), e.g. an interface with a mass storage, a flash memory, ROM, an optical disc or a magnetic support and/or transmitted over a communication interface (75), e.g. an interface to a point to point link, a communication bus, a point to multipoint link or a broadcast network.

In accordance with other examples, the bitstream carrying on the metadata is obtained from a source. Exemplarily, the bitstream is read from a local memory, e.g. a video memory (74), a RAM (74), a ROM (73), a flash memory (73) or a hard disk (73). In a variant, the bitstream is received from a storage interface (75), e.g. an interface with a mass storage, a RAM, a ROM, a flash memory, an optical disc or a magnetic support and/or received from a communication interface (75), e.g. an interface to a point to point link, a bus, a point to multipoint link or a broadcast network.

In accordance with examples, device 70 being configured to implement the method as described above, belongs to a set comprising:
- a mobile device;
- a communication device;
- a game device;
- a tablet (or tablet computer);
- a laptop;
- a still image camera;
- a video camera;
- an encoding/decoding chip;
- TV set;
- a set-top-box;
- a display;
- a still image server; and
- a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Figure 8:
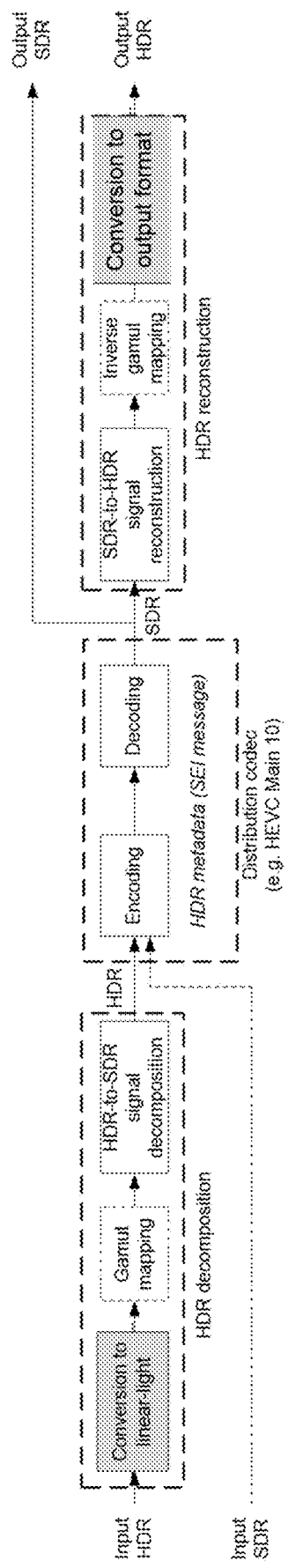
FIG. 8 is a schematic diagram illustrating an exemplary HDR system in accordance with an embodiment of present principles.
Figure 9:
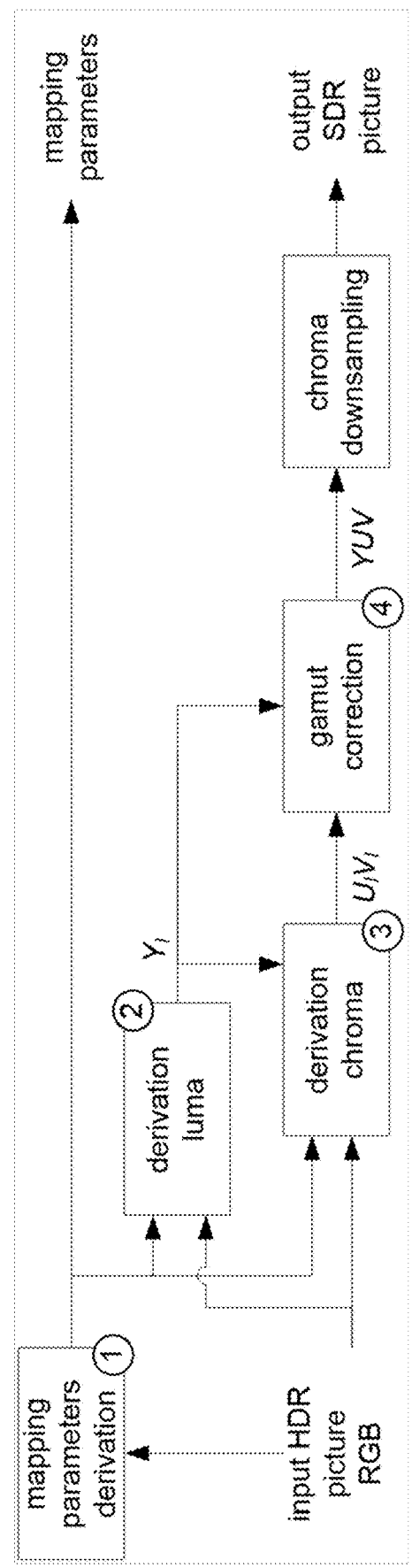
FIG. 9 is a schematic diagram illustrating an exemplary synoptic of HDR-to-SDR decomposition process in accordance with an embodiment.

The instructions may form an application program tangibly embodied on a processor-readable medium. In addition, as provided in FIG. 14, this can be accomplished locally or through remote devices communicating over a communication network in accordance with an embodiment of present principles FIG. 8 provides for a schematic block diagram of an HDR system architecture as per one embodiment. The block diagram depicts the HDR decomposition and reconstruction processes. The center block (dashed box) corresponds to the distribution encoding and decoding stages (e.g. based on HEVC or AVC video coding specifications). The two extreme left and right grey-coloured boxes respectively enable format adaptation to the input video signal of the HDR system and to the targeted system (e.g. a STB, a connected TV, etc.) connected with the HDR system. The black solid line boxes are showing the HDR specific processing. The present invention relates to both the HDR signal reconstruction process and the HDR metadata. The core component of the HDR decomposition stage is the HDR-to-SDR decomposition that generates an SDR video from the HDR signal. Optionally, a block of gamut mapping may be used when the input HDR and output SDR signals are represented with different color gamut or color spaces. The decoder side implements the inverse processes, in particular the SDR-to-HDR reconstruction step that goes back to HDR from the SDR video provided by the decoder.

The HDR-to-SDR decomposition process aims at converting the input linear-light 4:4:4 HDR, to an SDR compatible version (also in 4:4:4 format). The process also uses side information such as the mastering display peak luminance, color primaries, and the color gamut of the container of the HDR and SDR pictures. The HDR-to-SDR decomposition process generates an SDR backward compatible version from the input HDR signal, using an invertible process that guarantees a high quality reconstructed HDR signal.

The process is summarized herein. First, from the input HDR picture and its characteristics, mapping variables are derived. Then the luminance signal is mapped to an SDR luma signal using the luminance mapping variables. Then a mapping of the color to derive the chroma components of the SDR signal is applied. This step results in a gamut shifting, which is corrected by a final step of color gamut correction. The successive steps of the process, applied to each pixel of the input HDR picture, are depicted in the steps shown. Once the mapping parameters have been derived (step 1), a luminance mapping function, noted $LUT_{TM}$, is obtained. The next steps can be summarized as follows. First, the luma signal is derived from the HDR linear-light RGB signal and from the luminance mapping function (step 2)

A derivation of linear-light luminance L is then obtained from linear-light RGB signal is obtained then as follows:

$$L = A_1 \begin{bmatrix} R \\ G \\ B \end{bmatrix} \quad \text{(eq.1)}$$

$$Y_{tmp} = LUT_{TM}(L) \quad \text{(eq.2)}$$

with $A=[A_1\ A_2\ A_3]^T$ being the conventional 3×3 R'G'B'-to-Y'CbCr conversion matrix (e.g. BT.2020 or BT.709 depending on the colour space), $A_1$, $A_2$, $A_3$ being 1×3 matrices.

Then the linear-light luminance L is mapped to an SDR-like luma $Y_{tmp}$, using the luminance mapping function:

$$Y_{tmp} = LUT_{TM}(L) \quad \text{(eq. 3)}$$

In the next step, the chroma components are built as follows (step 3 of FIG. 8), A pseudo-gammatization using square-root (close to BT.709 OETF) is applied $$\begin{bmatrix} R_S \\ G_S \\ B_S \end{bmatrix} = \begin{bmatrix} \sqrt{R} \\ \sqrt{G} \\ \sqrt{B} \end{bmatrix} \quad \text{(eq.4)}$$

Then the U and V values are derived as follows:

$$\begin{bmatrix} U_{pre0} \\ V_{pre0} \end{bmatrix} = \begin{bmatrix} A_2 \\ A_3 \end{bmatrix} \begin{bmatrix} R_S \\ G_S \\ B_S \end{bmatrix} \times 1024 \quad \text{(eq.5)}$$

In the final step, a colour correction (step 4) is applied
The U and V values are corrected as follows:

$$\begin{bmatrix} U_{pre1} \\ V_{pre1} \end{bmatrix} = CLAMPUV\left(\frac{1}{\beta_0(Y_{pre0})} \cdot \begin{bmatrix} U_{pre0} \\ V_{pre0} \end{bmatrix}\right) = \quad \text{(eq.6)}$$

$$CLAMPUV\left(\frac{1024}{\beta_0(Y_{pre0})} \cdot \begin{bmatrix} A_2 \\ A_3 \end{bmatrix} \begin{bmatrix} \sqrt{R} \\ \sqrt{G} \\ \sqrt{B} \end{bmatrix}\right)$$

where $A_2$, $A_3$ are made of the second and third lines of coefficients of the conversion matrix from R'G'B'-to-Y'CbCr, and $\beta_0$ is the pre-processing colour correction LUT, and the CLAMP function is a clamping function defined by CLAMPUV(x)=min(max(x, −512), 511) for a 10 bits YUV output.

The luma component is corrected as follows:

$$Y_{pre1} = Y_{pre0} - \nu \times \max(0, a \cdot U_{pre1} + b \cdot V_{pre1}) \quad \text{(eq. 7)}$$

Where a and b are two pre-defined parameters, and which results in the output SDR signal $Y_{pre1}U_{pre1}V_{pre1}$.

The luminance mapping variables used in the JHDR Tone mapping curve are defined in SMPTE ST 2094-20.

Figure 10A:
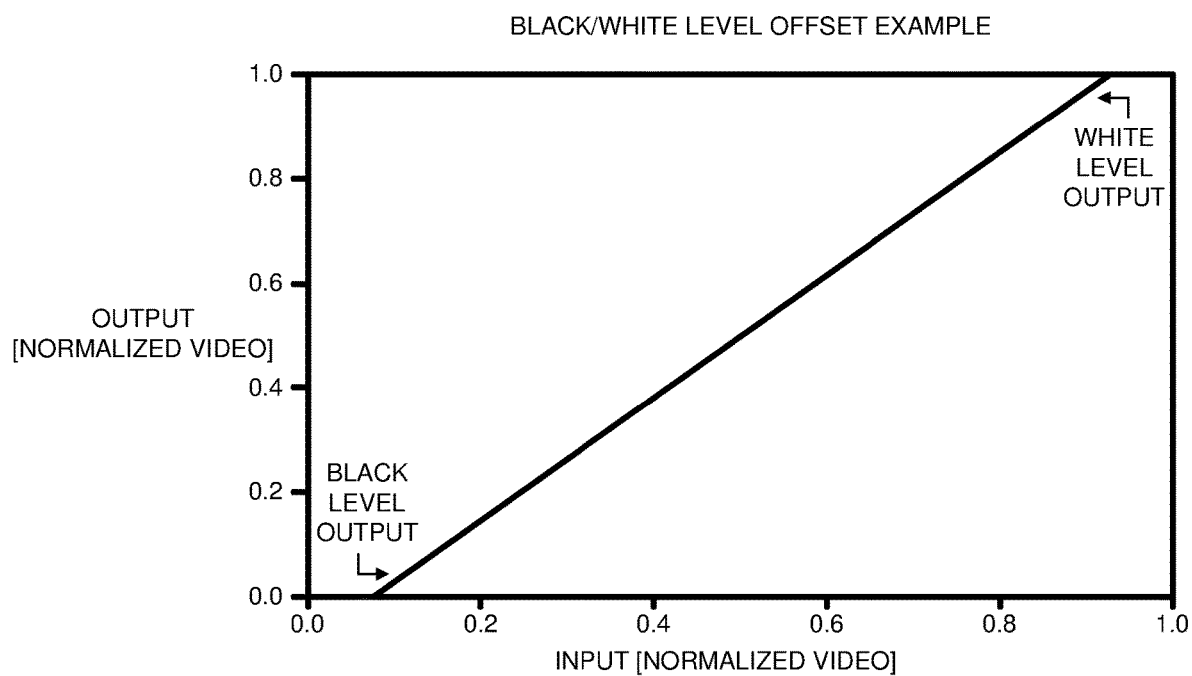
FIGS. 10a and 10b provide different graphical depictions of mapping curves with variable luminance components.

In FIG. 10a, Black level offset indicates the variable for offset to be subtracted from the signal and is used to calculate the gain of the signal as a first step in the luminance mapping curve reconstruction process. The value shall be in the bounded range [0 to 1] and in multiples of (1÷255). The White level offset variable is used to calculate the gain of the signal as a second step in the luminance mapping curve reconstruction process. The value shall be in the bounded range [0 to 1] and in multiples of (1÷255).

Figure 10B:
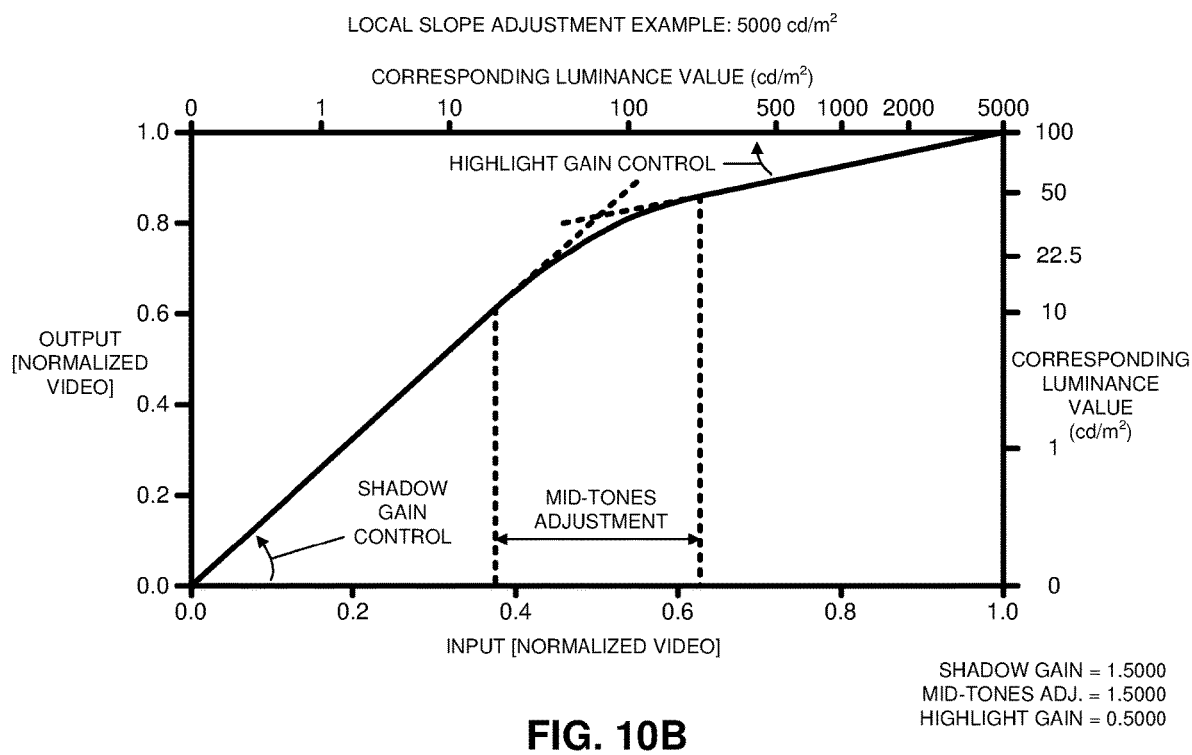

For FIG. 10b, the Shadow Gain Control is the variable that indicates the gain that is used to adjust the steepness of the luminance mapping curve in its shadow (darker) region. The value shall be in the bounded range [0 to 2] and in multiples of (2÷255). The Highlight Gain Control variable indicates the gain that is used to adjust the width of the luminance mapping curve in their mid-tone region. The value shall be in the bounded range [0 to 2] and in multiples of (2÷255).

Similarly, the Midtone adjustment variable indicates the gain that is used to adjust the width of the luminance mapping curve in their mid-tone region. The value shall be in the bounded range [0 to 2] and in multiples of (2÷255).

Figure 11:
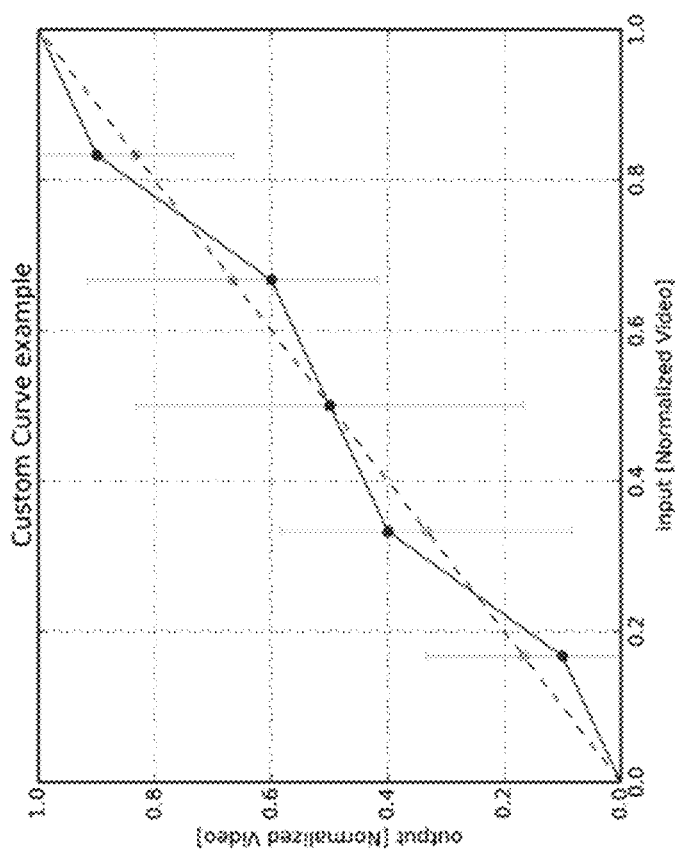
FIG. 11 is a graphical illustration of an input tone mapping curve.

In addition, there is a Fine Tuning Function that specifies a number of pivot points in the piece-wise linear tone mapping output fine tuning function that maps a local tone mapping input value to an adjusted one. In the following example, as shown in FIG. 11, the input tone mapping curve is in dashed line and is the identity (the tone mapping is a simple quantization). The output tone mapping function is represented in plain line.

Figure 12:
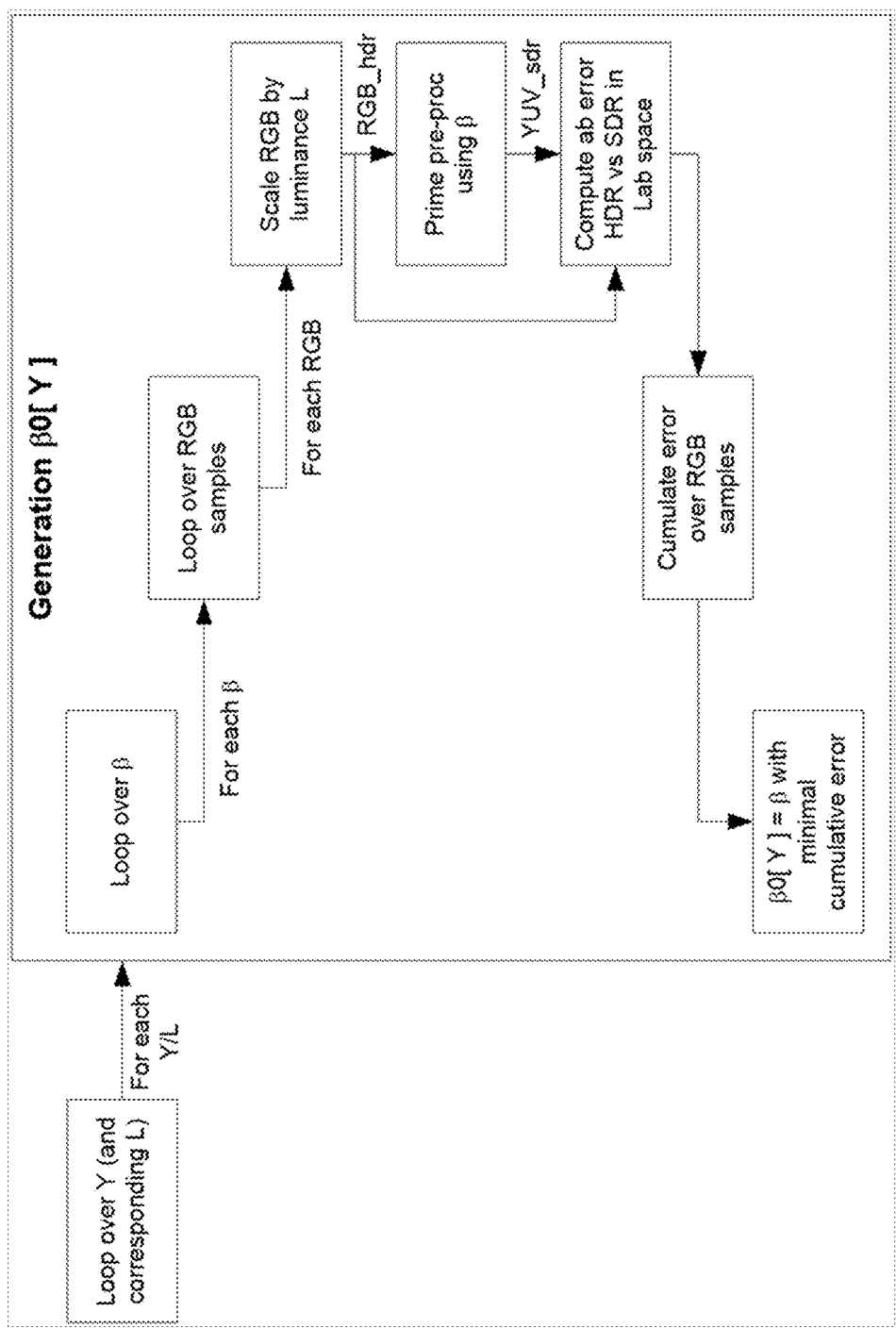
FIG. 12 is a schematic diagram illustrating a synoptic for LUT generation in accordance with an embodiment of present principles.

The process for this deriving of the LUT $\beta_0$ is independent from the content can be performed in the following manner. This is shown by reference to the block diagram shown in FIG. 12. The process of FIG. 12 applies in the container color gamut and takes into account the content color gamut.

The process can be summarized as follows. For each luma value Y, the following steps are applied. The luminance is generated using the inverse function of $LUT_{TM}$: $L=invLUT_{TM}[Y]$. Then the best $\beta_0[Y]$ for luminance L (and therefore for luma Y) is identified as follows. Values $\beta_{test}$ in a given pre-defined range are evaluated as follows. The cumulative error err associated to $\beta_{test}$ is computed as follows.

err is initialized to 0.

A scanning of the RGB cube is performed, and each RGB sample is modified to reach a luminance of 1 cd/m². Then the following applies $$\begin{cases} R = L \times R_{SDR} \\ G = L \times G_{SDR} \\ B = L \times B_{SDR} \end{cases} \quad (eq.8)$$

The output sample YUVSDR as described in the HDR-to-SDR decomposition process is built, with $\beta\_0 = \beta\_test$. Then an error in the Lab color space, errorab, between RGBsdr and RGBhdr is computed. This step is controlled by a parameter (saturation skew) that enables to control the color saturation of the derived SDR signal. And err is updated as follows:

err=err+error$_{ab}$ (eq. 9)

The final value $\beta_0[Y]$ corresponds to $\beta_{test}$ giving the lowest cumulated err value among all the tested $\beta_{test}$ values.

The LUTs $\beta_0$ and $\beta_P$ are linked by the following equation $$\beta_P(Y) = \frac{\beta_O(Y)}{K \times \sqrt{L(Y)}} \quad (eq.10)$$

Where K is a constant value.

For addressing the RGB saturation issue of the SDR, when the image or video is sent to a medium like a TV screen, for example, the YUV signal is converted to RGB using the following matrices $$\begin{bmatrix} R \\ G \\ B \end{bmatrix} = invA \begin{bmatrix} Y_{pre1} \\ U_{pre1} \\ V_{pre1} \end{bmatrix} \quad (eq.11)$$

-continued $$\text{With } invA = \begin{bmatrix} invA_{11} & invA_{12} & invA_{13} \\ invA_{21} & invA_{22} & invA_{23} \\ invA_{31} & invA_{32} & invA_{33} \end{bmatrix}$$

being the conventional 3×3 Y'CbCr-to-R'G'B' conversion matrix (e.g. BT.2020 or BT.709 depending on the colour space). The YUV space is much larger than the RGB space. Therefore, some YUV combination can gives RGB values that does not satisfy, for a 10 bit frame for instance, (noting RGB either R, G or B components):

$0 \le RGB \le 1023$ (eq. 12)

Which indicates $0 \le invA_{11}Y_{pre1} + invA_{12}U_{pre1} + invA_{13}V_{pre1} \le 1023$ $0 \le invA_{21}Y_{pre1} + invA_{22}U_{pre1} + invA_{23}V_{pre1} \le 1023$ $0 \le invA_{31}Y_{pre1} + invA_{32}U_{pre1} + invA_{33}V_{pre1} \le 1023$ (eq. 13)

Figure 13:
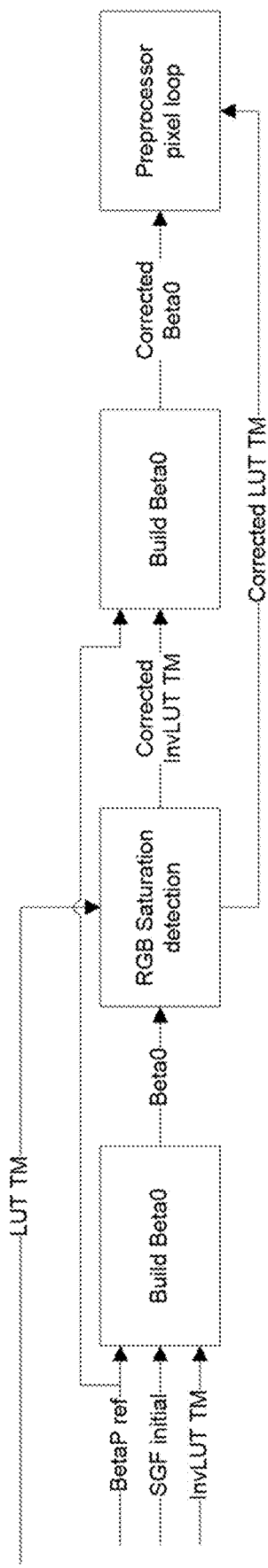
FIG. 13 is a block diagram showing a tone mapping algorithm in accordance with an embodiment of present principles.

In FIG. 13, an exemplary algorithm is provided in order to completely remove the RGB saturation. It should be noted that while in this particular example, for completion purposes, a colored example is provided this is not required. The proposed functions can be computed that will lower the initial Tone Mapping. These functions are noted coefR, coefB and coefG that are with respect to Ypre1. They will allow to compute a new corrected Tone Mapping function that will be slightly darker.

The methodology can be used with algorithms that create several Tone Mapping Curves in its considerations as follows:

The initial Tone Mapping Curve that may produce RGB saturation

The Rough Corrected Tone Mapping Curve which remove RGB saturation but may be non monotonous and produce visual artifacts such as banding effects The corrected Tone Mapping Curve which is a monotonous tone mapping curve that will not produce visual artifacts In addition, this same process can be applied to both HDR codecs that have a Constant Luminance mode (already discussed) and one that has a Non Constant Luminance mode. The latter computes HDR luma Y' instead of a linear-light luminance L from linear-light RGB signal while maintaining the compatibility with SLHDR1 post-processing. In one embodiment, this luma Y' component is a weighted sum of gamma-compressed R'G'B' components of a color video depending of the input color gamut. In this way, the HDR chrominance (U'$_{HDR}$, V'$_{HDR}$) components are corrected to produce SDR chroma components.

Figure 15:
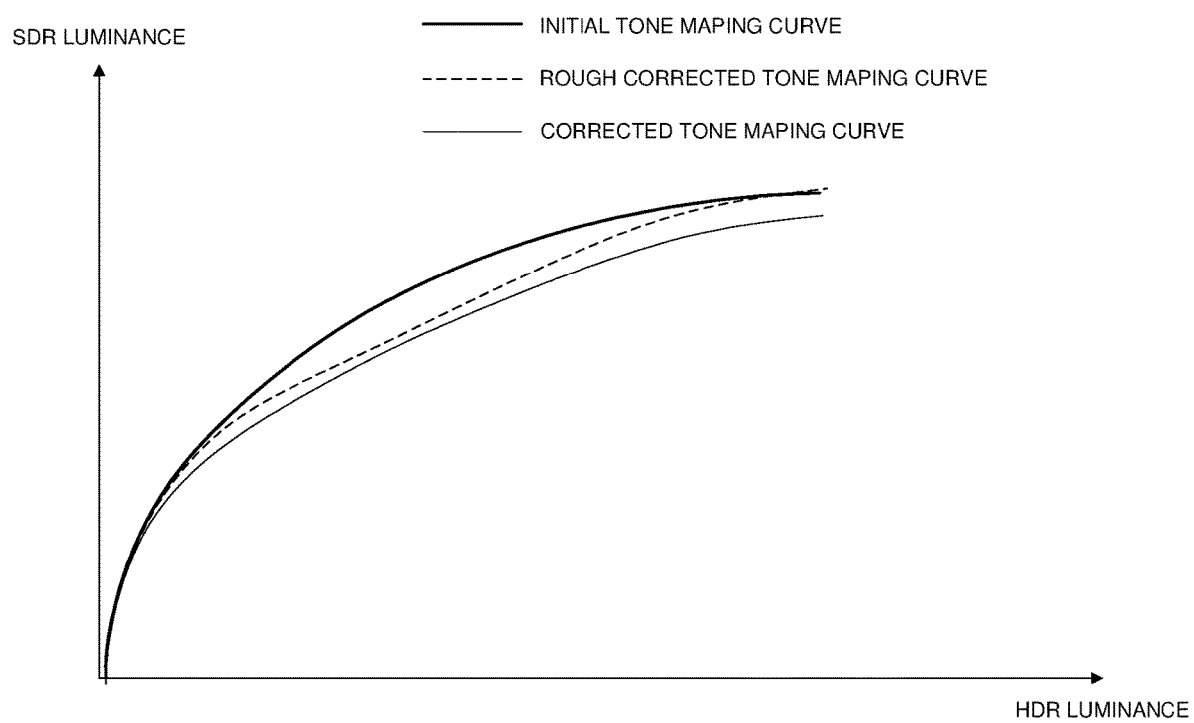
FIG. 15 provides graphical depictions of tone mapping curves with variable luminance components.

FIG. 15 provides for a graphical depiction of the result of the embodiments discussed above. In this example, a method can be used with a particular algorithm with the following characteristics:

Build the Beta0 color correction with the initial tone mapping curve in the same way that described previously Iterate on the current sub sampled frame pixels and compute the RGB values that are potentially saturated (eq. 13, Saturation detection bloc)

In order to compute the RGB saturation coefficient if needed the following calculations can be made:

if $R > 1023$; $coefR(Y_{pre1}) =$  (eq.14)
$$\min\left(\frac{1023 - invA_{12}U_{pre1} - invA_{13}V_{pre1}}{invA_{11}Y_{pre1}}, coefR(Y_{pre1})\right)$$

if $G > 1023$; $coefG(Y_{pre1}) =$
$$\min\left(\frac{1023 - invA_{22}U_{pre1} - invA_{23}V_{pre1}}{invA_{21}Y_{pre1}}, coefG(Y_{pre1})\right)$$

if $B > 1023$; $coefB(Y_{pre1}) =$
$$\min\left(\frac{1023 - invA_{32}U_{pre1} - invA_{33}V_{pre1}}{invA_{31}Y_{pre1}}, coefB(Y_{pre1})\right)$$

These coefficients indicates how much the SDR Luminance should be decrease in order to not saturate the SDR frame. This gives a new rough corrected tone mapping curves:

Rough Corrected LUT TM($Y_{pre1}$)=LUT TM($Y_{pre1}$)*
min(coefR($Y_{pre1}$),coefG($Y_{pre1}$),coefB($Y_{pre1}$))

Figure 16:
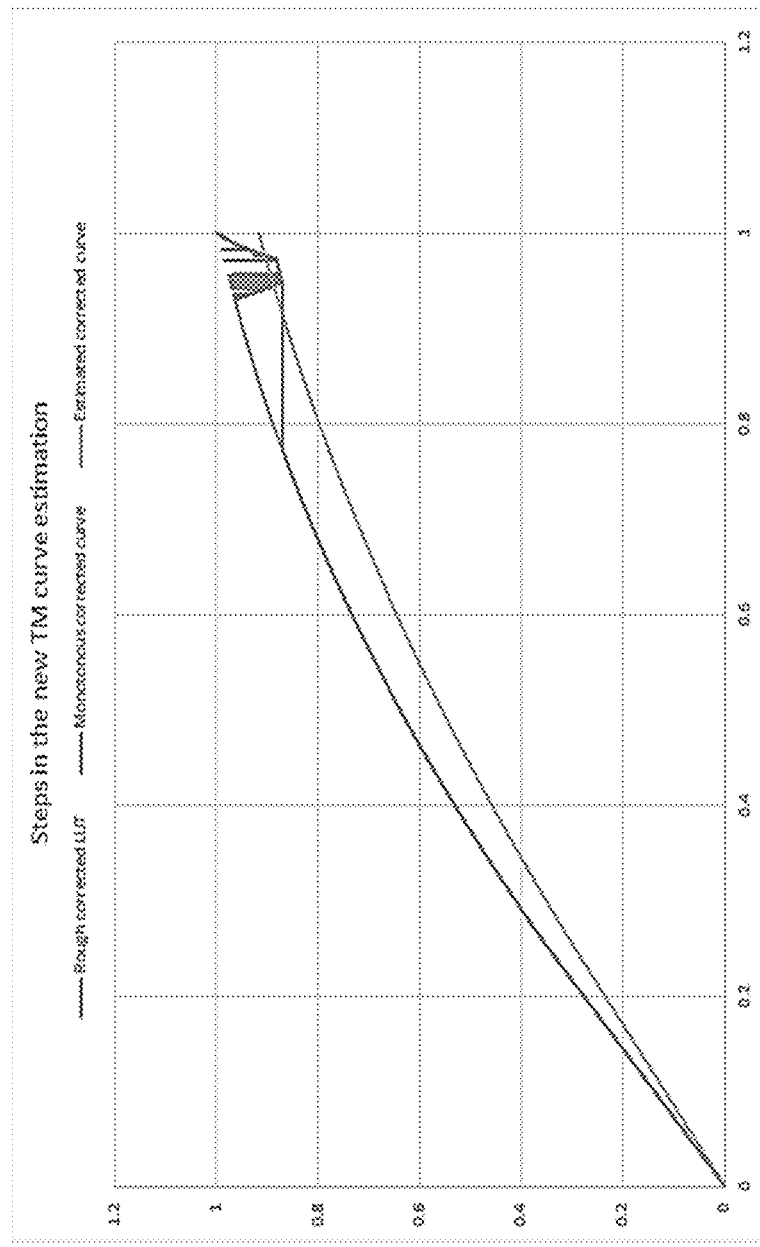
FIG. 16 is a graphical illustration for curve correction estimation in accordance to one embodiment of present principles.

In FIG. 16, an example of the Rough corrected LUT in the perceptual domain. We can see that the initial tone mapping curve creates some saturation for high luminances. To make this monotonous, a code such as the one provided below can be used:

```
for(int i = fineTuningY.size( )-2; i >=0; i --){
    if(fineTuningY[i] > fineTuningY[i+1]){
        fineTuningY[i] = fineTuningY[i+1];
    }
}
```

Which results in a tone mapping curve that presents some flat areas.

Figure 17:
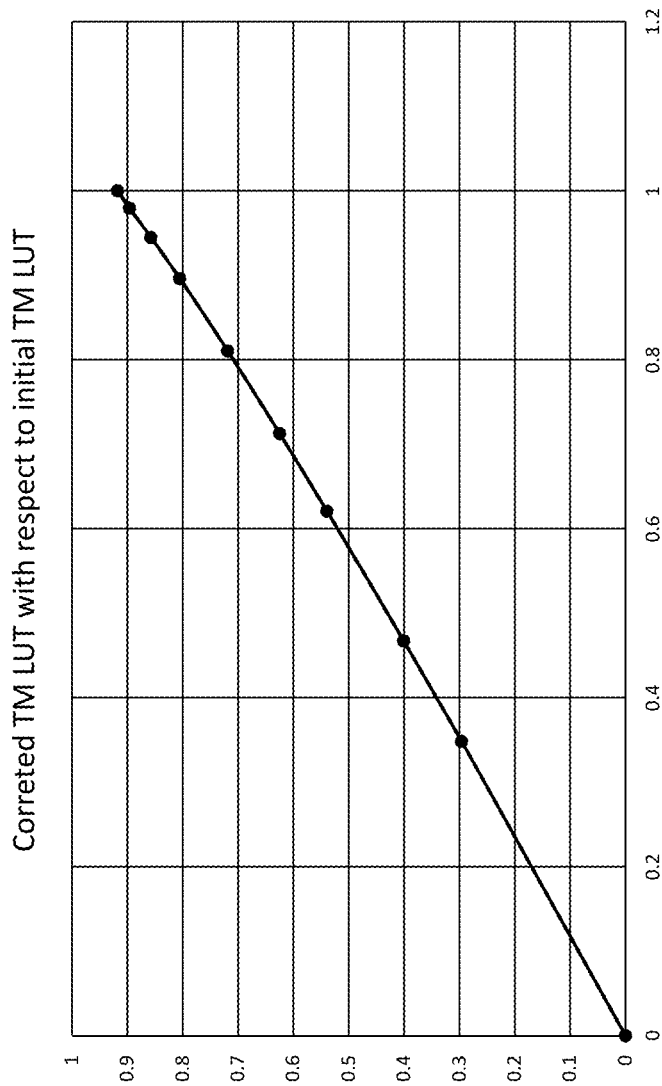
FIG. 17 is a graphical depiction of a corrected LUT in accordance with one embodiment of present principles.

For the computation of the final curve using negative white stretch as shown in FIG. 17, the final step is to measure the length of the largest flat area of the monotonous curve to estimate a negative white stretch. The negative white stretch is chosen as minus the largest flat area. The final tone mapping curve is then recomputed and is drawn in gray. This new curve ensures that most of the RGB saturation problem will be solved by giving a darker SDR. For the computation of the final curve using fine tuning function, in FIG. 17, the final tone mapping curve is drawn with respect to the initial tone mapping curve. This function is approximated by a piece wise linear function which points as shown.

Figure 14:
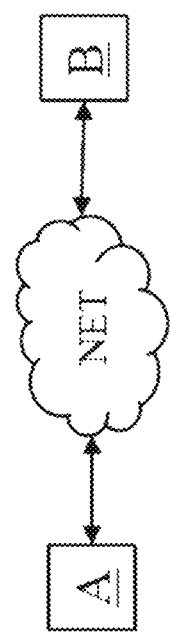
FIG. 14 is a block diagram illustration of remote devices communicating over a communication network in accordance with an embodiment of present principles.

According to an embodiment illustrated in FIG. 14, in a transmission context between two remote devices A and B over a communication network NET, the device A comprises means which are configured to implement a method for encoding an picture as described in relation with the FIGS. 2-7 and the device B comprises means which are configured to implement a method for decoding as described in relation with FIGS. 8-12.

According to an embodiment of the disclosure, the network is a broadcast network, adapted to broadcast still pictures or video pictures from device A to decoding devices including the device B.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

Figure 18:
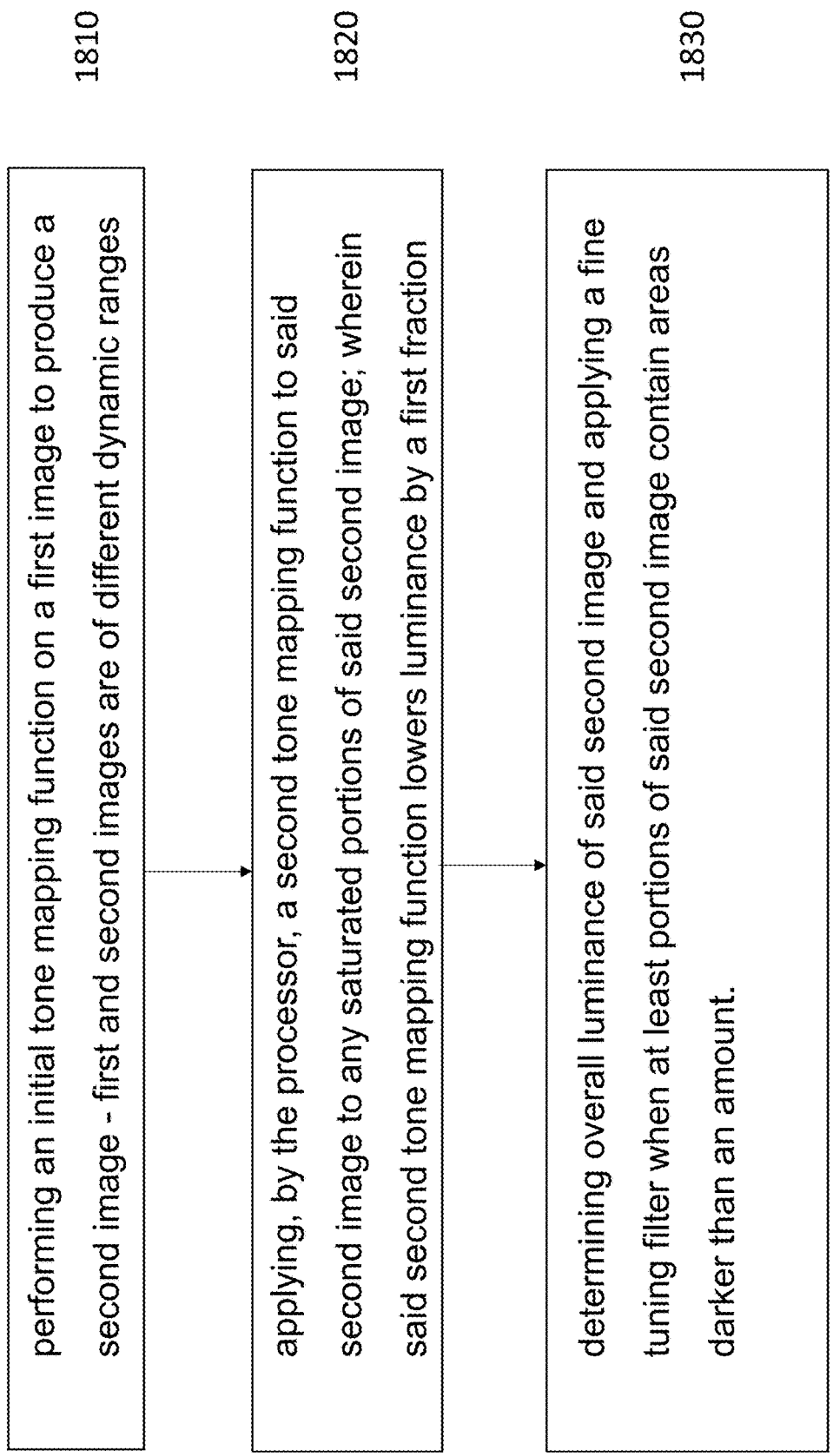
FIG. 18 is a flowchart depiction of a methodology in accordance to one embodiment of present principles.

FIG. 18 provides for a flow chart illustration of a methodology that can provide matching colors between images of different dynamic ranges. In the example of FIG. 18, an image or series of images such as in a video or image stream with HDR can be provided to an output device having a limited range such as an SDR. In step 1810, processing means including a single processor is configured to perform an initial tone mapping function on a first image or alternatively a plurality of images such as in a video or image stream. This will provide a second image wherein the first and second images are of different dynamic ranges as discussed. The processing mean then applies a second tone mapping function as in step 1820 to areas of the second image that are saturated. In one embodiment, the second tone mapping function lowers luminance by a first fraction. As was previously discussed, in one embodiment, this is performed based on a calculated coefficient that lowers a plurality of luminance components. In step 1830, the overall luminance is analyzed and if determined that the second image is too dark, a fine tuning filter is applied. This will increases the overall luminance of the second image by a second fraction. The second fraction is lower than the first fraction.

Figure 19:
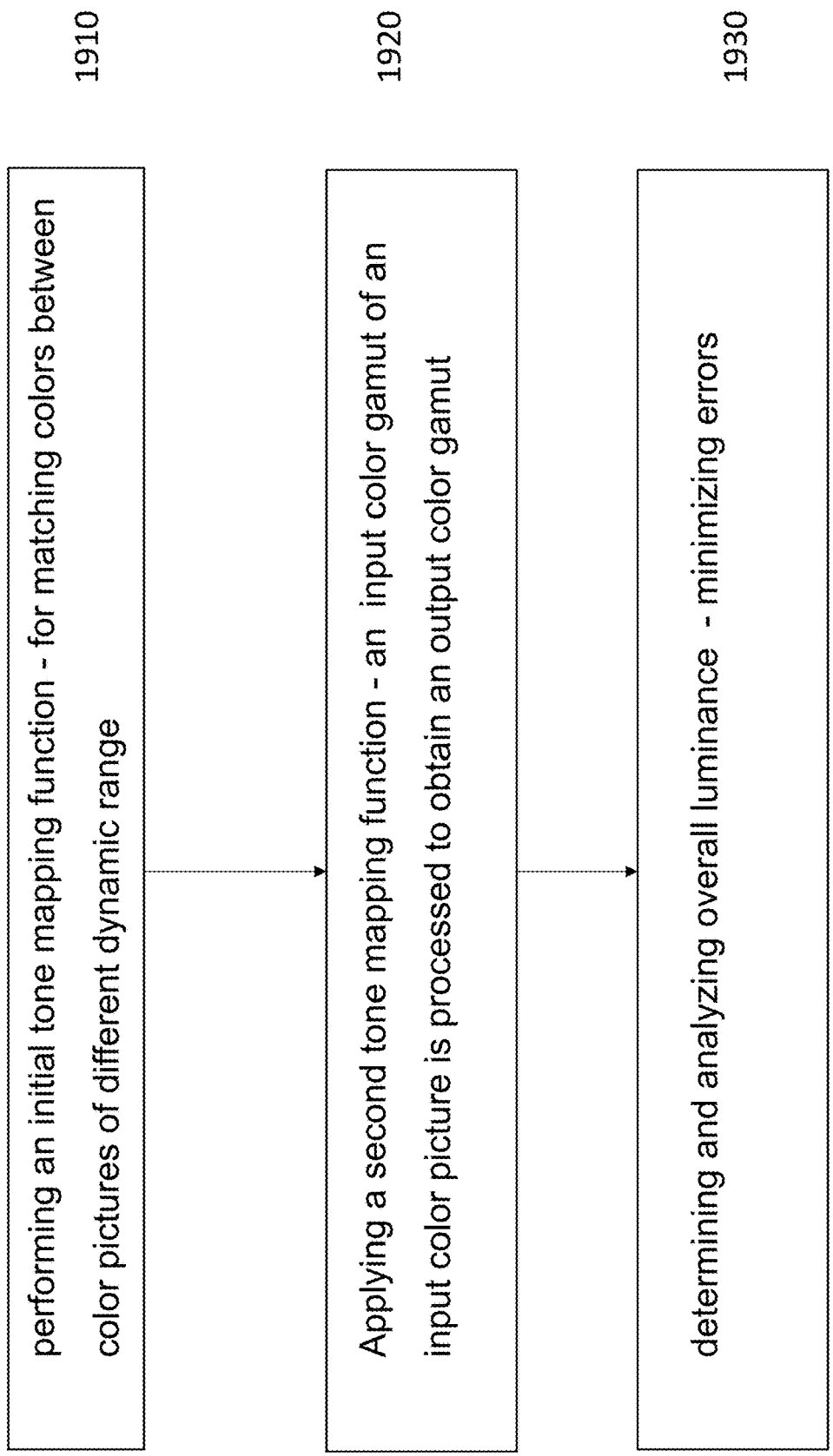
FIG. 19 is a flowchart depiction of a methodology in accordance to another embodiment of present principles.

In FIG. 19, an alternate embodiment to flowchart depiction of FIG. 18 is provided. In step 1910, a method for matching colors between color pictures of different dynamic range is provided. Like in FIG. 18, processing means including a single processor is configured to perform an initial tone mapping function on a first image or alternatively a plurality of images such as in a video or image stream. In this way an input color gamut of an input color picture is processed to obtain an output color gamut of 20 an output color picture 1920. As in 1820, the processing means performs an initial tone mapping function based on a calculated coefficient that lowers a plurality of luminance components. The output color gamut is also modified and fine tuned as before in 1930. The modifying may further comprises minimizing a perceived color error distance between the input color gamut and the output color gamut.

In steps 1830 and 1930, the methodology may also include determining overall luminance of said second image and applying a fine tuning filter when at least portions of said second image contain areas darker than an amount. In both cases, the second image is to be displayed on an output device having a display.

In this way, as provided in flowchart depictions of FIGS. 18 and 19 and as discussed specifically in conjunction with FIGS. 8-12, the distribution of a compressed HDR video can be distributed to a device with a more limited dynamic range. For this purpose, a codec has been proposed with a color correction function, β', that is used to control the colors of the derived SDR pictures. Consequently, for example, in this way it is ensured that the SDR that is sent to an output device, like a TV, does not have saturated RGB components which could results in clipping effects. Modifying the initially computed Tone Mapping curve such as in 1830 and 1930 allows the reduction of the SDR (i.e. RGB for the TV example) saturation. This is important, especially since the output device (i.e. TV in this example) cannot process this as it will not have adequate information. Therefore, any correction has to be addressed at the pre-processing stage.

The first image may have a high dynamic range and the second image may have a standard dynamic range and fine tuning and luminance determination may be provided so as to prevent any pixel in the second image to be clipped because of the maximum and minimum luminance levels in the first or second image in the saturation portions. The first and second image may comprise at least a portion of pixel counts in red or green. A Red-Green-Blue (RGB) filter may be applied for color correction of the first and second images prior to displaying the second image on the output device. The input color gamut may be defined as a finite set of points in an xy plane of a XYZ colorspace. A final image may be displayed on an output device having a display.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   performing a first tone mapping function on a first image to produce a second image, wherein the first image and the second image have different dynamic ranges;
   detecting saturated areas of the second image and responsively applying a second tone mapping function to the second image, wherein the second tone mapping function lowers luminance by a first fraction and desaturates the saturated areas; and
   determining overall luminance of the second image and applying a fine tuning filter in response to determining at least one portion of the second image contains areas darker than an amount, wherein the fine tuning filter increases the overall luminance of the second image by a second fraction.

2. The method of claim 1, wherein the first image has a high dynamic range and the second image has a standard dynamic range, and wherein applying the fine tuning filter and determining overall luminance are provided to prevent clipping of any pixel in the second image because of maximum and minimum luminance levels in the saturated areas.

3. The method of claim 1, wherein the first image and the second image comprise at least a portion of pixel counts in red or green.

4. The method of claim 1, further comprising applying a Red-Green-Blue (RGB) filter for color correction of the first image and the second image prior to displaying the second image on output device.

5. The method of claim 1, wherein the second tone mapping function includes a calculated coefficient that lowers a plurality of luminance values.

6. The method of claim 1, wherein the second image has a lower dynamic range than a dynamic range of the first image.

7. The method of claim 1, wherein the fine tuning filter increases overall luminance of the second image by a second fraction, wherein the second fraction is lower than the first fraction.

8. The method of claim 1, wherein an input color gamut includes a finite set of points in an xy plane of XYZ colorspace.

9. The method of claim 1, wherein a final image is formatted for display on an output device having a display.

10. The method of claim 1, further comprising:
    obtaining an input color gamut related to the first image;
    obtaining an output color gamut related to the second image as formatted for display on an output device;

modifying the output color gamut to match the input color gamut by calculating a minimized perceived color error between the input color gamut and the output color gamut.

11. The method of claim 6, wherein the second tone mapping function reduces saturation of the second image.

12. A system comprising at least one processor configured to:
perform a first tone mapping function on a first image to produce a second image, wherein the first image and the second image have different dynamic ranges;
detect saturated areas of the second image and responsively apply a second tone mapping function to the second image, wherein the second tone mapping function lowers luminance by a first fraction and desaturates the saturated areas; and
determine overall luminance of the second image and apply a fine tuning filter in response to determining at least one portion of the second image contains areas darker than an amount, wherein the fine tuning filter increases the overall luminance of the second image by a second fraction.

13. The system of claim 12, wherein the first image has a high dynamic range and the second image has a standard dynamic range, and wherein applying the fine tuning filter and determining overall luminance provided to prevent clipping of any pixel in the second image because of maximum and minimum luminance levels in the saturated areas.

14. The system of claim 12, wherein the first image and the second image comprise at least a portion of pixel counts in red or green.

15. The system of claim 12, wherein the at least one processor is configured to apply a Red-Green-Blue (RGB) filter for color correction of the first image and the second image prior to displaying the second image on an output device.

16. The system of claim 12, wherein the second tone mapping function includes a calculated coefficient that lowers a plurality of luminance values.

17. The system of claim 12, wherein the second image has a lower dynamic range than a dynamic range of the first image.

18. The system of claim 12, wherein the fine tuning filter increases overall luminance of the second image by a second fraction, wherein the second fraction is lower than the first fraction.

19. The system of claim 12, wherein an input color gamut includes a finite set of points in an xy plane of XYZ colorspace.

20. The system of claim 12, wherein a final image is formatted for display on an output device having a display.

21. A non-transitory computer-readable storage medium having stored instructions that, when executed by a processor, cause the processor to:
perform a first tone mapping function on a first image to produce a second image, wherein the first image and the second image have different dynamic ranges;
detect saturated areas of the second image and responsively applying a second tone mapping function to the second image, wherein the second tone mapping function lowers luminance by a first fraction and desaturates the saturated areas; and
determine overall luminance of the second image and applying a fine tuning filter in response to determining at least one portion of the second image contains areas darker than an amount, wherein the fine tuning filter increases the overall luminance of the second image by a second fraction.

* * * * *

UNITED STATES PATENT AND TRADEMARK OFFICE
CERTIFICATE OF CORRECTION

PATENT NO. : 11,024,017 B2
APPLICATION NO. : 16/205505
DATED : June 1, 2021
INVENTOR(S) : Francois Cellier et al.

It is certified that error appears in the above-identified patent and that said Letters Patent is hereby corrected as shown below:

In the Claims

Claim 2, Column 26, Line 38, after "determining" insert --the--.

Claim 4, Column 26, Line 48, before "output" insert --an--.

Claim 7, Column 26, Lines 55-57, delete "wherein the fine tuning filter increases overall luminance of the second image by a second fraction,".

Claim 13, Column 27, Line 27, after "determining" insert --the--.

Claim 13, Column 27, Line 27, after "luminance" insert --are--.

Claim 18, Column 28, Lines 10-12, delete "wherein the fine tuning filter increases overall luminance of the second image by a second fraction,".

Claim 21, Column 28, Line 25, replace "applying" with --apply--.

Claim 21, Column 28, Line 30, replace "applying" with --apply--.

Signed and Sealed this
Ninth Day of August, 2022

Katherine Kelly Vidal
*Director of the United States Patent and Trademark Office*